(12) United States Patent
Kaminaga et al.

(10) Patent No.: US 6,666,381 B1
(45) Date of Patent: Dec. 23, 2003

(54) INFORMATION PROCESSING DEVICE, INFORMATION PROCESSING METHOD AND SMARTCARD

(75) Inventors: Masahiro Kaminaga, Sakado (JP); Takashi Endo, Musashimurayama (JP); Takashi Watanabe, Kokubunji (JP); Masaru Ohki, Tokorozawa (JP)

(73) Assignee: Hitachi, Ltd., Tokyo (JP)

( * ) Notice: Subject to any disclaimer, the term of this patent is extended or adjusted under 35 U.S.C. 154(b) by 439 days.

(21) Appl. No.: 09/809,214

(22) Filed: Mar. 16, 2001

(30) Foreign Application Priority Data

Mar. 16, 2000 (JP) ........................................ 2000-079305

(51) Int. Cl.[7] .............................................. G06K 19/06
(52) U.S. Cl. ...................................................... 235/492
(58) Field of Search ................................ 235/492, 451, 235/380; 705/50, 41, 17

(56) References Cited

U.S. PATENT DOCUMENTS 6,089,460 A * 7/2000 Hazama ...................... 235/492
6,126,071 A * 10/2000 Yoshimura .................. 235/382

* cited by examiner

*Primary Examiner*—Michael G. Lee
*Assistant Examiner*—Jamara A. Franklin
(74) *Attorney, Agent, or Firm*—Antonelli, Terry, Stout & Krause, LLP

(57) ABSTRACT

A tamper-resistant information device for use with IC cards, etc. having high security. The tamper-resistant information device has an input unit for inputting a signal, a storage unit for storing a program, an operation unit for performing predetermined data processing according to a program, and an output unit for outputting a signal. The program stored in the above storage unit includes one or more data processing instructions giving an execution direction to the operation unit. When the signal input from the above data inputting unit is subjected to data processing, at least one of the above data processing instructions instructs an operation on a signal A and a signal B to be performed, where the signal B is used for a given calculation in data processing, the above operation including the steps of: arbitrarily dividing the signal A or B into pieces; performing a given operation on each piece of the divided signal and on the remaining undivided signal, separately; and adding all the operation results to obtain the proper encrypted signal.

9 Claims, 27 Drawing Sheets

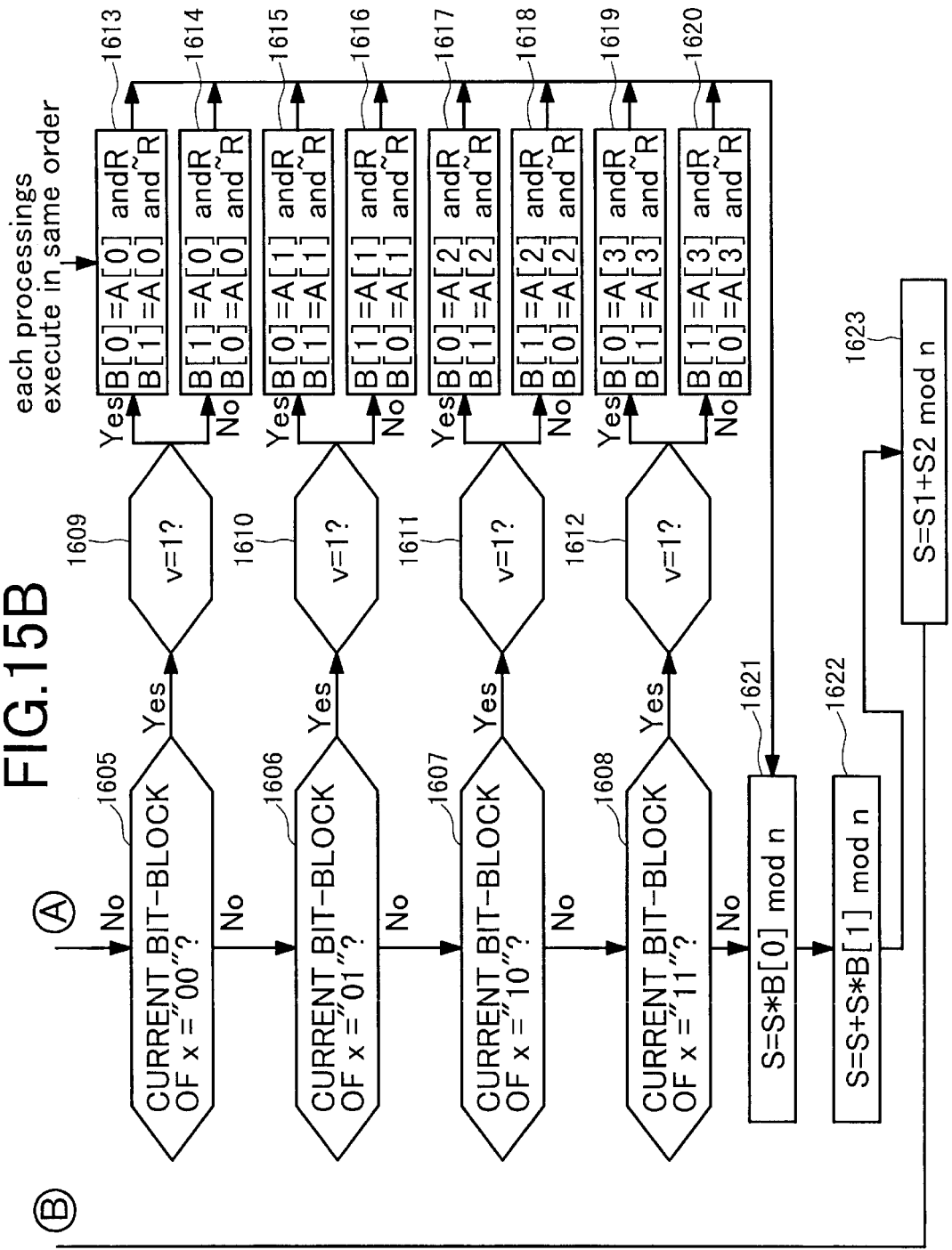

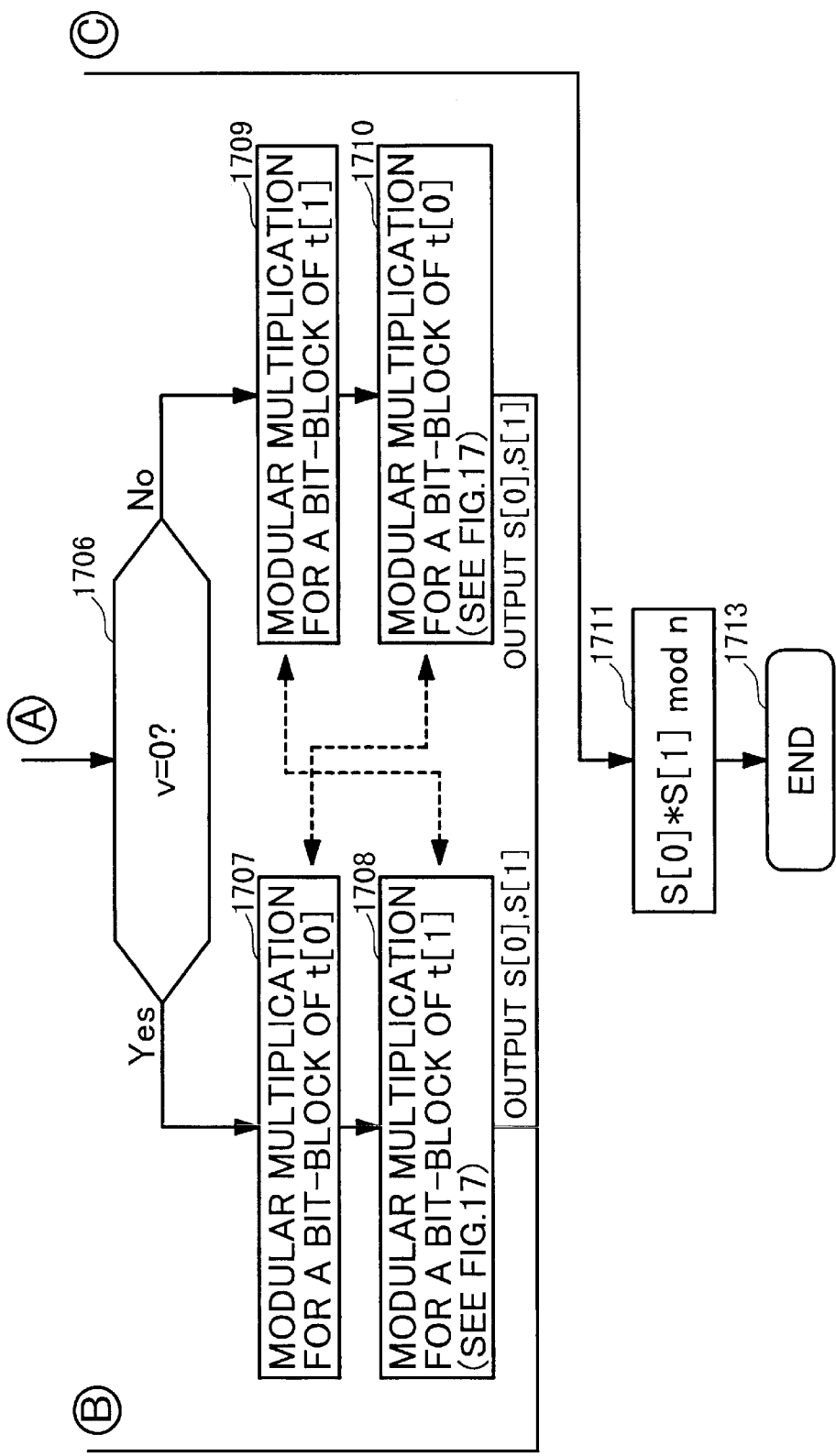

(1) call ID
(2) return ID

INFORMATION PROCESSING DEVICE, INFORMATION PROCESSING METHOD AND SMARTCARD

BACKGROUND OF THE INVENTION

The present invention relates to a tamper-resistant information processing device. It is particularly very effective when applied to cards such as the IC card.

An IC card is a device used for such purposes as to hold personal information which should not be altered without permission, to encrypt data by use of a cryptographic key (which is secret information), or to decrypt ciphertext. The IC card does not have any power source therein, but when it is inserted in a,reader/writer for IC cards, the IC card is supplied with power and becomes operable. When the IC card is in the operable state, it receives a command transmitted from the reader/writer, and carries out a process such as transfer of data according to the command.

FIG. 1 shows a basic conceptual configuration of an IC card in which an IC card chip 102 is mounted on a card 101. As shown in the figure, an IC card generally has disposed thereon a supply voltage terminal Vcc, a ground terminal GND, a reset terminal RST, an input/output terminal I/O, and a clock terminal CLK. The positions of these terminals are specified in ISO International Standard 7816. The IC card receives power from the reader/writer and exchanges data with the reader/writer. Such communication between the IC card and the reader/writer is described, for example, on page 41 of a book entitled "SMARTCARD HANDBOOK" authored by W. Rankl and W. Effing and published by John Wiley & Sons in 1997.

The configuration of the semiconductor chip mounted on an IC card is basically the same as that of the ordinary microcomputer. FIG. 2 is a block diagram showing the basic configuration of the semiconductor chip mounted on an IC card. As shown in FIG. 2, the semiconductor chip for cards has a central processing unit (CPU) 201, a memory device 204, an input/output (I/O) port 207, and coprocessor 202. Some systems do not employ the coprocessor. The CPU 201 is a device for performing logic and arithmetic operations, while the memory device 204 stores programs and data. The input/output port is a device for communicating with the reader/writer. The coprocessor performs cryptographic processing itself or operations necessary for cryptographic processing at high speed. For example, types of coprocessors employed include a particular operation device for performing a residue operation for RSA and a cryptographic device for performing a rounding process for DES. There are many IC card processors which do not have any coprocessors. A data bus 203 is a bus connecting one device to another.

The memory device 204 includes such memories as a ROM (Read Only Memory), a RAM (Random Access Memory), and an EEPROM (Electric Erasable Programmable Read Only Memory). Information stored in a ROM cannot be altered, and therefore ROMs are used to store mainly programs. Information stored in a RAM, on the other hand, can be freely rewritten, but the stored information disappears once the power supply is interrupted. That is, since the power supply to an IC card is interrupted when the IC card is removed from the reader/writer, the RAM can no longer hold its contents after that. The EEPROM, in contrast, can continue holding its contents even if its power supply is interrupted. Therefore, the EEPROM is used for storing data which it is necessary to rewrite, and hold even when the IC card is removed from the reader/writer. For example, the number of the remaining call units of a prepaid telephone card is rewritten each time the card is used, and the call unit data must continue to be held even after the card is removed from the reader/writer. This is why the call unit data of the prepaid card is held in an EEPROM.

SUMMARY OF THE INVENTION

The present invention provides a tamper-resistant information device for use with cards having high security.

Specifically, an object of an embodiment according to the present invention is to reduce the correlation between the contents of data processing operations and consumed currents in a card component such as the IC card chip. Reducing the correlation between the contents of the data processing operations and the consumed currents in the chip makes it difficult to estimate what is being processed in the IC card chip and how, and to derive the cryptographic key from the observed waveforms of the consumed currents. Thus, the present invention provides cards with high security.

Since IC cards have an IC card chip mounted thereon which is capable of holding programs and important information, they are used to store important information or internally perform cryptographic processing. It has been conventionally considered that the difficulty of breaking a code stored in an IC card is the same as the difficulty of deriving its encryption algorithm. However, it is pointed out that the details of the encryption processing operation and the cryptographic key may be derived by observing and analyzing the current consumed during the encryption process in the IC card, which may be easier than deriving of the encryption algorithm. The consumed current is obtained by measuring the current supplied from the reader/writer to the IC card. The details of this attack and its danger are described, for example, on page 263 (8.5.1.1 Passive Protective Mechanisms) of the book "SMARTCARD HANDBOOK" authored by W. Rankl & W. Effing and published by John Wiley & Sons. The following specifically describes the attack. Each CMOS constituting an IC card chip consumes a current when its output state switches from "1" to "0" or vice versa. Particularly, a large current flows through the data bus 203 when the bus value changes from 1 to 0 or vice versa. The current of the bus driver, the wiring employed, and the capacitance associated with transistors connected to the wiring cause such a current to flow. Therefore, it is possible to identify what is operating in the IC card chip by observing the consumed current.

FIG. 3 shows single-cycle waveforms of currents consumed in an IC card chip. The current waveforms are different from one another as indicated by reference numerals 301 and 302, depending on the processed data. More specifically, such a difference occurs depending on data flowing through the bus 203 and data processed in the central processing unit 201.

The coprocessor 202 can perform, for example, 512-bit modular multiplication in parallel with the CPU processing. This means that it is possible to observe the waveform of a current different from that in the CPU for a long time. Therefore, the number of operations performed by the coprocessor can be measured by observing its particular current waveform. If the number of operations performed by the coprocessor has some relationship to the cryptographic key, it might be possible to derive the key from the number of operations.

Further, if which operation is performed or what is operated by the coprocessor changes depending on the cryptographic key, the dependency might be found by observing the corresponding change in the consumed current, and the cryptographic key might be derived.

Similarly, in the CPU, the influence of each bit value of the cryptographic key on processed data might be obtained by changing the data a plurality of times and observing the corresponding change in each consumed current. It might be possible to derive the cryptographic key by statistically processing the waveforms of these consumed currents.

The ideas on which embodiments of the present invention are based include: dividing a process performed in an IC card so that attackers cannot specify the process as a whole; and inserting a dummy process. These methods make it difficult to identify the original process and derive the cryptographic key from the waveforms of the consumed currents.

A tamper-resistant device as represented by the IC card chip is regarded as an information processing device having one or more data processing means which each comprise: a program storage unit for storing a program; a memory unit having a data storage unit for storing data; and a central processing unit (CPU) for performing a predetermined process to process data according to the program; wherein the program is composed of process instructions for giving an execution direction to the CPU.

A method according to an embodiment of the present invention for scrambling the correlation between processed data and consumed currents in an IC card chip is to divide the data into pieces, and instead of performing a given operation(s) on the entire data as a whole, perform another different operation(s) on each piece of the divided data so as to still produce the same results as those that will be obtained if the given operation is performed on the entire data as a whole. As a result, the essential operation(s) can be concealed.

Specifically, pieces of scramble data R1, R2, ..., and Rn are prepared. Original data D1 to be processed is divided into data blocks D1[1], D1[2], ..., and D1[n].

The data blocks and scramble data are used to produce scrambled data blocks x[1], x[2], ..., and x[n] by employing, for example, one of the following methods:

(1) logical AND operation
(2) x[1]=0, x[2]=x−v
(3) x[1]=x AND R, x[2]=x AND ~R, where ~R is the inverse of R That is, by using the scramble data R1, R2, ..., and Rn, where R1 XOR R2 XOR ... XOR Rn=2^L−1 (L is the bit length of D1), the data block (original data) D1 is divided so that D2[1]=D1 AND R1, D2[2]=D1 AND R2, ..., and D2[n]=D1 AND Rn, where n is an integer. In this case, the equation D2[1]+D2[2]+ ... +D2[n]=D1 holds. In addition to the above logical AND operation, an ordinary addition operation or subtraction operation can be used for this purpose. A ring multiplication operation is performed on values obtained as a result of the above addition operation or subtraction operation to produce the final proper value. Since the randomly divided data blocks D2[1], D2[2], ..., and D2[n] are used instead of directly using the original data D1, it is difficult to determine the original data D1 from information included in the observed current waveform alone. When a plurality of waveforms are statistically processed (for example, averaged to remove noise components from them), the characteristics of each waveform are eliminated, which further makes it difficult to determine original data (effectively hiding original information). It should be noted that the above randomly divided data may be produced through a division operation using pseudorandom numbers.

Another method for reducing the correlation between the contents of the data processing operation and the consumed current is to change the original data to be processed, and instead of performing a given operation on the original data, perform another different operation on the changed data so as to still produce the final proper results but consume a current different from that which will be consumed if the given operation is performed on the original data.

Specifically, random scalar data R for scrambling other data is prepared. Then, by using the prepared random scalar data R and a particular element V, the element to be processed is changed from x to x+R*V, where the symbols "+" and "*" denote ordinary addition and multiplication operations, respectively. The element V has the characteristic that whether or not the element V is added to data, an operation on the data produces the same results as if the element V were not added to the data. The above x+R*V can be used as an exponent or a scalar to scramble statistical processing of waveform observation data of consumed currents. It should be noted that the above element V acts as a number of 1 in a multiplication operation, and 0 in an addition operation. For example, when N=pq, where N is the modulus of a public key in the RSA cryptosystem, the element V is a multiple of (p−1) (q−1). When a scalar multiple of a base point on an elliptic curve is used, the element V is a multiple of the order of the base point.

Further, randomly determining the order in which each piece of the divided data is processed further makes it difficult to find the correlation between the contents of the data processing operation and the consumed current.

Still further, combining all the above methods for scrambling encrypted data is effective in further reducing the correlation between the contents of the data processing operation and the consumed current.

The present invention can be applied to information hiding for modular multiplication and modular exponentiation in the RSA cryptography. Furthermore, in the elliptic curve cryptography, it can be applied to information hiding for multiplication and division in underlying fields, and the calculation of a scalar multiple of a base point. In modular multiplications, the logical AND operation described above is used to divide data, and then the distributive law is used to obtain the final proper result from the divided data. In the modular exponentiation and the calculation of a scalar multiple of a base point, the exponent is divided by means of ordinary subtraction, then modular exponentiation is performed on each piece of the divided exponent, and the product of the operation results is calculated to obtain the final result (proper answer). These operations are effective in scrambling encrypted data. It should be noted that the above modular multiplications include multiplication in a prime field.

BRIEF DESCRIPTION OF THE DRAWINGS

FIG. 15B is a flowchart showing the second part of the above process of randomly determining the order of process steps after input data is divided;

FIG. 16B is a flowchart showing the second part of the above process of randomly determining the order of process steps after a given exponent is divided;

DESCRIPTION OF THE PREFERRED EMBODIMENTS

Figure 1:
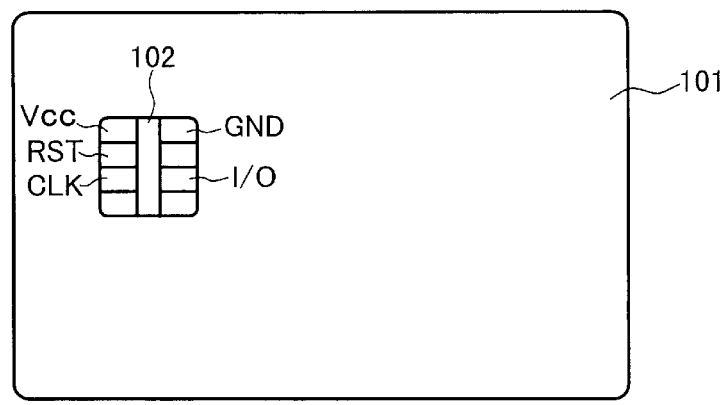
FIG. 1 is a plan view of an IC card and its terminals.
Figure 2:
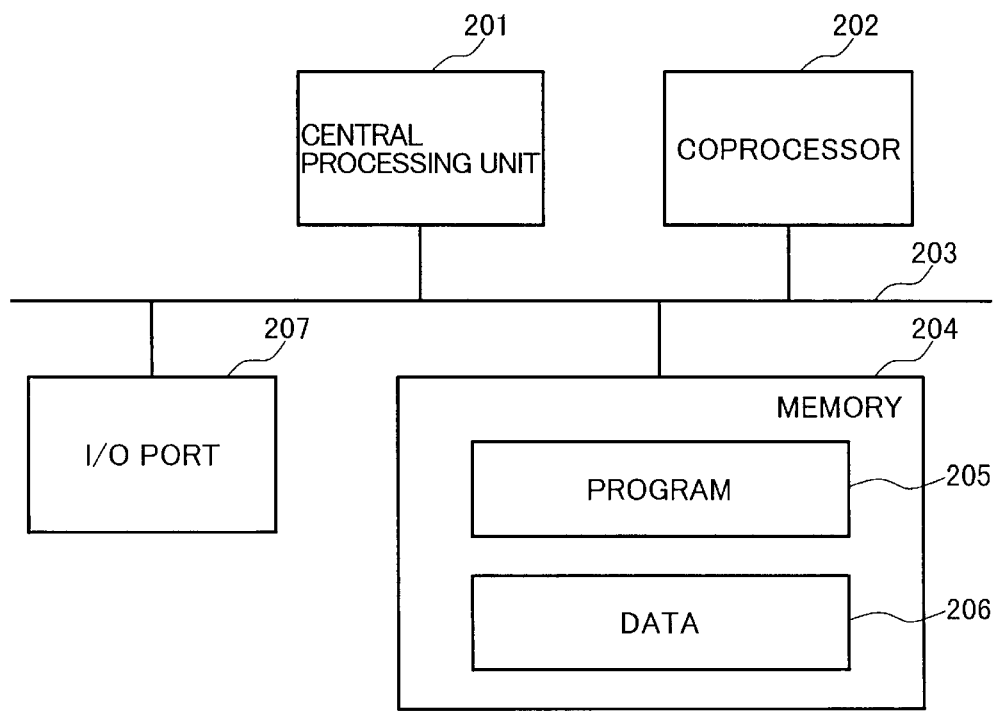
FIG. 2 is a block diagram showing the basic configuration of a microcomputer.
Figure 3:
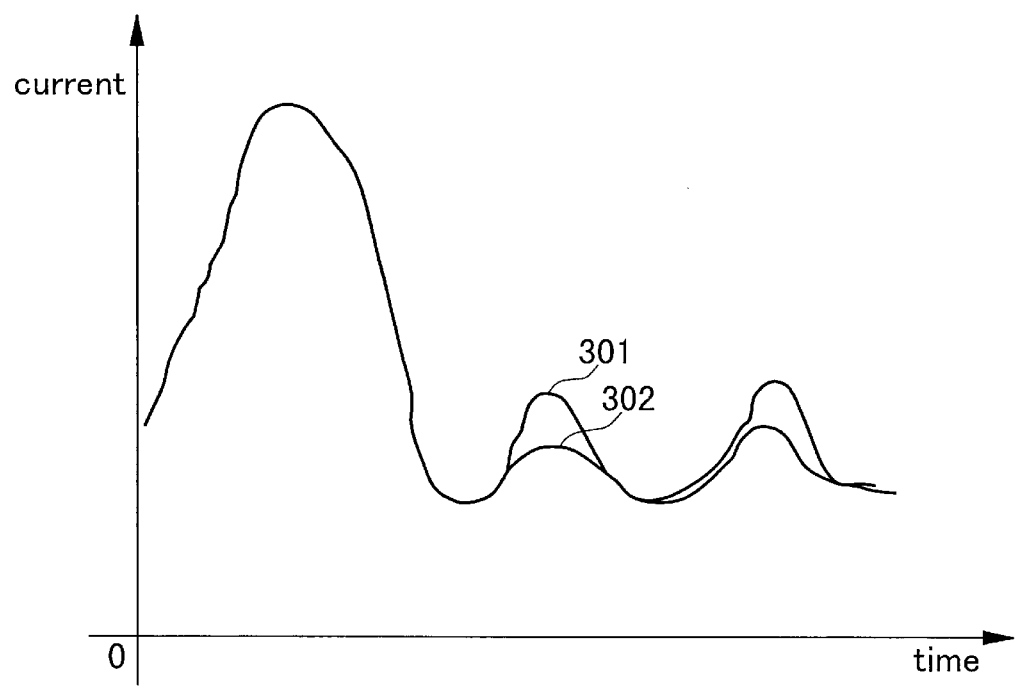
FIG. 3 is a diagram showing waveforms of currents consumed in an IC card.

This specification describes various embodiments of the present invention. Therefore, to make it easy to understand the various aspects of the present invention, description will be first made of the outline of the basic ideas on which the various embodiments of the present invention are based by using a representative RSA cryptographic method as an example before explaining specific embodiments of the present invention. Then, major aspects of embodiments of the present invention will be outlined. These aspects are further described in detail later.

To explain how to encrypt data (plaintext) to be transmitted, the following description uses, as an example, general RSA encryption, which is a base for all encryption methods.

The general RSA encryption can be expressed by the following formula.

$$y = R^e \bmod N,$$

where y is ciphertext, R is plaintext, e is a public exponent, and N is a public modulus. Further, the public exponent e is also expressed as $$ex \bmod \Phi(N) = 1,$$

where $\Phi(N) = (p-1)(q-1)$, which is the Euler's totient function.

The receiver of the ciphertext decrypts it using the following formula.

$$R = y^x \bmod N,$$

where y is the ciphertext, x is a secret exponent, and N is the public modulus. The secret exponent x is held within the card, specifically, in the IC chip mounted on the card.

The present invention is based on the idea that the information receiving side divides the ciphertext y and/or the secret exponent x and scrambles the divided data, and then combines the divided data to restore the plaintext R. The present invention provides methods for dividing the ciphertext y or the secret exponent x, and scrambling them.

The gist of each preferred embodiment according to the present invention is described and classified along with its specific example as follows.

Next, each preferred embodiment of the present invention will be outlined.

An information processing device according to a first embodiment of the present invention comprises: means for inputting a signal; a storage unit for storing a program; an operation unit for performing predetermined data processing according to a program; and means for outputting a signal; wherein the program stored in the above storage unit includes one or more data processing instructions giving an execution direction to the operation unit; whereby when the signal input from the above data inputting means is subjected to data processing, at least one of the above data processing instructions instructs calculation of the expression A○B to be performed, where (and hereinafter) the character "A" denotes a signal, the character "B" denotes a signal used for a given calculation in data processing, and the symbol "○" denotes a given operation, the above calculation to be performed including the steps of: arbitrarily dividing A into pieces A[1], A[2], . . . , and A[n], where $A=A[1]+A[2]+ \ldots +A[n]$, and n is an integer equal to or more than 1; by using the above pieces $A[1], A[2], \ldots$, and $A[n]$, and the above signal B used for a given calculation in data processing, calculating each of the equations $B[1]=A[1] \bigcirc B$, $B[2]=A[2] \bigcirc B, \ldots$ and $B[n]=A[n] \bigcirc B$ to obtain $B[1], B[2], \ldots$, and $B[n]$, separately; and calculating the addition $B[1]+B[2]+ \ldots +B[n]$, where n is an integer equal to or more than 1.

An information processing device according to a second embodiment of the present invention comprises: means for inputting a signal; a storage unit for storing a program; storage means for storing a result of a predetermined calculation; an operation unit for performing predetermined data processing according to a program; and means for outputting a signal; wherein the program stored in the above storage unit includes one or more data processing instructions giving an execution direction to the operation unit; whereby when the signal input from the above data inputting means is subjected to data processing, at least one of the above data processing instructions instructs calculation of the expression $A \bigcirc B$ to be performed, where (and hereinafter) the character "A" denotes a signal, the character "B" denotes a signal used for a given calculation in data processing, and the symbol "$\bigcirc$" denotes a given operation, the above calculation to be performed including the steps of: arbitrarily dividing B into pieces $B[1], B[2], \ldots$, and $B[n]$, where $B=B[1]+B[2]+ \ldots +B[n]$, and n is an integer; by using the above signal A and the above pieces $B[1], B[2], \ldots$, and $B[n]$, calculating each of the equations $A[1]=A \bigcirc B[1]$, $A[2]=A \bigcirc B[2], \ldots$, and $A[n]=A \bigcirc B[n]$ to obtain $A[1], A[2], \ldots$, and $A[n]$, separately; and calculating the addition $A[1]+A[2]+ \ldots +A[n]$, where n is an integer.

Further, an information processing device according to a third embodiment of the present invention combines the basic ideas of the above first and second embodiments as follows. When the signal A and the signal B are used to calculate the expression $A \bigcirc B$, both of them are divided before a given operation (indicated by the symbol "$\bigcirc$") is performed upon them.

That is, the third embodiment calculates $A \bigcirc B$ by the equation $A \bigcirc B = (A[1]+A[2]+ \ldots +A[m]) \bigcirc (B[1]+B[2]+ \ldots +B[n])$. The operation $(A[1]+A[2]+ \ldots +A[m]) \bigcirc (B[1]+B[2]+ \ldots +B[n])$ can be expanded as follows.

$$(A[1]+A[2]+ \ldots +A[m]) \bigcirc (B[1]+B[2]+ \ldots +B[n]) =$$

$$A[1] \bigcirc (B[1]+B[2]+ \ldots +B[n]) +$$

$$A[2] \bigcirc (B[1]+B[2]+ \ldots +B[n]) \ldots +$$

$$A[m] \bigcirc (B[1]+B[2]+ \ldots +B[n]) =$$

$$A[1] \bigcirc B[1] + A[1] \bigcirc B[2] + \ldots A[1] \bigcirc B[n] +$$

$$A[2] \bigcirc B[1] + A[2] \bigcirc B[2] + \ldots A[2] \bigcirc B[n]$$

$$\ldots + A[m] \bigcirc B[1] + A[m] \bigcirc B[2] + \ldots A[m] \bigcirc B[n].$$

Accordingly, the above operation is expressed as $\Sigma A[i] \bigcirc B[j]$ (where $i=1,2, \ldots$, and m and $j=1,2, \ldots$, and n, and the symbol "$\Sigma$" indicates summation operation). This method is advantageous with n or m set to a relatively small value. Because setting a large value for n and m makes the operation process long since both signals A and B are to be divided in this method. That is, whether or not this method is advantageous depends on the values set for n and m. It should be noted that when both signals A and B are divided, $i \neq 1$ and $j \neq 1$.

When the above first, second, or third embodiment is applied to communications using a card, the signal A corresponds to information to be transmitted, namely, plaintext, and the signal B corresponds to key information. In the following descriptions of embodiments of the present invention, the signals A and B correspond to plaintext and key information, respectively, used for cards unless otherwise mentioned.

Algebra dictates that the addition operation "+" and the multiplication operation "$\bigcirc$" as employed in the above first, second, and third embodiments are regarded as operations in a commutative ring S. The commutative ring S has two operations, which are the addition operation and the multiplication operation. Integer operations are often used as these operations.

This specification uses concepts and terms used by mathematics, especially algebra, to describe various operations employed in the above three preferred embodiments and the embodiments of the present invention described below. The following embodiments according to the present invention differ from one another in how to divide key information.

An information processing device according to a fourth embodiment of the present invention comprises: means for inputting a signal; a storage unit for storing a program; storage means for storing a result of a predetermined calculation; an operation unit for performing predetermined data processing according to a program; and means for outputting a signal; wherein the program stored in the above storage unit includes one or more data processing instructions giving an execution direction to the operation unit; whereby when the signal input from the above data inputting means is subjected to data processing, at least one of the above data processing instructions instructs calculation of the expression $A^k$ to be performed, where (and hereinafter) the character "A" denotes a signal, the character "k" denotes a signal used for a given calculation in data processing, and $A^k = A \bigcirc A \bigcirc \ldots \bigcirc A$ (the right side of the equation including k number of A's and "k−1" number of "$\bigcirc$"s, which each denote a given operation), the above calculation to be performed including the steps of: dividing k into pieces $k[1], k[2], k[3]$, and $k[n]$, where $k=k[1]+k[2]+k[3]+ \ldots +k[n]$, and n is an integer; by using the above signal A and the above pieces $k[1], k[2], k[3], \ldots$, and $k[n]$, calculating each of the equations $h[1]=A^{k[1]}$, $h[2]=A^{k[2]}, \ldots$, and $h[n]=A^{k[n]}$ to obtain $h[1], h[2], \ldots$, and $h[n]$, separately; and calculating the expression $A^k$ by the equation $A^k = h[1] \bigcirc h[2] \bigcirc \ldots \bigcirc h[n]$.

Algebra dictates that the above operation $\bigcirc$ as employed in the present embodiment is regarded as an operation in a semigroup S. The semigroup has one operation. An integer operation is often used as the above operation.

The above algebraic consideration concerning the operation employed in the present embodiment can be applied to similar operations appearing in the following descriptions in this specification.

An information processing device according to a fifth embodiment of the present invention comprises: means for inputting a signal; a storage unit for storing a program; storage means for storing a result of a predetermined calculation; an operation unit for performing predetermined data processing according to a program; and means for outputting a signal; wherein the program stored in the above storage unit includes one or more data processing instructions giving an execution direction to the operation unit; whereby when the signal input from the above data inputting means is subjected to data processing in which the expression $A^x$ is to be calculated, where the characters "A" denotes a signal, the character "x" denotes a signal used for a given calculation in data processing, and $A\hat{~}x=A\bigcirc A\bigcirc \ldots \bigcirc A$ (the right side of the equation including x number of A's and "x−1" number of "$\bigcirc$"s, which each denote an operation), at least one of the above data processing instructions instructs calculation of the expression $A\hat{~}(x+T)$ to be performed i instead, where $A\hat{~}T=e$.

Algebra dictates that the above operation $\bigcirc$ as employed in the present embodiment is regarded as an operation in a monoid S. The monoid is a semigroup having the identity element e. An integer operation is often used as the above operation. The above algebraic consideration concerning the operation employed in the present embodiment can be applied to similar operations appearing in the following descriptions in this specification.

Next, description will be made of information processing methods according to the present invention.

An information processing method according to a sixth embodiment of the present invention employs: inputting means for inputting an information signal; storage means for storing a program for a predetermined operation; and an output unit for outputting a calculation result; wherein the above method uses an information signal A input from the above inputting means and a signal B to calculate the expression $A\bigcirc B$ (the symbol "$\bigcirc$" indicates a multiplication operation) according to steps stored in the above storage means, the above steps comprising the steps of: arbitrarily dividing the above information signal A into pieces A[1], A[2], ..., and A[n], where A=A[1]+A[2]+ ... +A[n], and n is an integer; by using the above pieces A[1], A[2], ..., and A[n] and the above signal B, performing each of the equations $B[1]=A[1]\bigcirc B$, $B[2]=A[2]\bigcirc B$, ..., and $B[n]=A[n]\bigcirc B$ to obtain B[1], B[2], ..., and B[n], separately, where n is an integer equal to or more than 1; and calculating the expression $A\bigcirc B$ by the equation $A\bigcirc B=B[1]+B[2]+ \ldots +B[n]$, where the symbol "+" indicates an addition operation.

It should be noted that the above signal B is used for a transformation calculation of the information signal A.

An information processing method according to a seventh embodiment of the present invention employs: inputting means for inputting a signal to be transmitted; storage means for storing a program for a predetermined operation; and an output unit for outputting a calculation result; wherein the above method uses an information signal A input from the above inputting means and a signal B to calculate the expression $A\bigcirc B$ (the symbol "$\bigcirc$" indicates a multiplication operation) according to steps stored in the above storage means, the above steps comprising the steps of: arbitrarily dividing the signal B used for the above transformation calculation into pieces B[1], B[2], ..., and B[n], where B=B[1]+B[2]+ ... +B[n], and n is an integer; by using the above information signal A and the above pieces B[1], B[2], ..., and B[n], calculating each of the equations $A[1]=A\bigcirc B[1]$, $A[2]=A\bigcirc B[2]$, ..., and $A[n]=A\bigcirc B[n]$ to obtain A[1], A[2], ..., and A[n], separately, where n is an integer; and calculating the expression $A\bigcirc B$ by the equation $A\bigcirc B=A[1]+A[2]+ \ldots +A[n]$, where the symbol "$\bigcirc$" indicates a multiplication operation and the symbol "+" indicates an addition operation.

An information processing method according to a eighth embodiment of the present invention combines the basic ideas of the above sixth and seventh embodiments as follows. When the signal A and the signal B are used to calculate the expression $A\bigcirc B$, both of them are divided before a given operation (indicated by the symbol "$\bigcirc$") is performed upon them.

That is, the eighth embodiment calculates $A\bigcirc B$ by the equation $A\bigcirc B=(A[1]+A[2]+ \ldots +A[m])\bigcirc(B[1]+B[2]+ \ldots +B[n])$. The operation $(A[1]+A[2]+ \ldots +A[m])\bigcirc(B[1]+B[2]+ \ldots +B[n])$ can be expanded as follows.

$$(A[1]+A[2]+ \ldots +A[m])\bigcirc(B[1]+B[2]+ \ldots +B[n])=$$

$$A[1]\bigcirc(B[1]+B[2]+ \ldots +B[n])+$$

$$A[2]\bigcirc(B[1]+B[2]+ \ldots +B[n]) \ldots +$$

$$A[m]\bigcirc(B[1]+B[2]+ \ldots +B[n])=$$

$$A[1]\bigcirc B[1]+A[1]\bigcirc B[2]+ \ldots A[1]\bigcirc B[n]+$$

$$A[2]\bigcirc B[1]+A[2]\bigcirc B[2]+ \ldots A[2]\bigcirc B[n] \ldots +$$

$$A[m]\bigcirc B[1]+A[m]\bigcirc B[2]+ \ldots A[m]\bigcirc B[n].$$

Accordingly, the above operation is expressed as $\Sigma A[i]\bigcirc B[j]$ (where i=1, ..., and m, and j=1, ..., and n, and the symbol "$\Sigma$" indicates summation operation). As can be seen from the above expression, if i=1, only the signal B is divided. If j=1, on the other hand, only the signal A is divided.

This method is advantageous with n or m set to a relatively small value. Because setting a large value for n and m makes the operation process long since both signals A and B are to be divided in this method. That is, whether or not this method is advantageous depends on the values set for n and m.

An information processing method according to a ninth embodiment of the present invention lets information on the information transmitting side and a signal k be elements A and k, respectively, in a semigroup S' adopted by this information processing method and performs calculation of the expression $A\hat{~}k$, where $A\hat{~}k=A\Delta A\Delta \ldots \Delta A$ (the right side of the equation including k number of A's and "k−1" number of "$\Delta$"s, which each denote an operation in the semigroup S'), the above calculation including the steps of: arbitrarily dividing k into pieces k[1], k[2], k[3], ..., and k[n], where k=k[1]+k[2]+k[3]+ ... k[n], and n is an integer equal to or more than 1; by using the above plaintext A and the above pieces k[1], k[2], k[3], ..., and k[n], calculating each of the equations $h[1]=A\hat{~}k[1]$, $h[2]=A\hat{~}k[2]$, ..., and $h[n]=A\hat{~}k[n]$ to obtain h[1], h[2], ... and h[n], separately; and calculating the expression $A\hat{~}k$ by the equation $A\hat{~}k=h[1]\Delta h[2]\Delta \ldots \Delta h[n]$, where the symbol "$\Delta$" denotes an operation in the semigroup S'.

An information processing method according to a tenth embodiment of the present invention lets information on the information transmitting side and a signal k be elements A and x, respectively, in a monoid S" (a semigroup having the identity element e) adopted by this information processing method, wherein when the expression $A\hat{~}x$ is to be calculated, where $A\hat{~}x=A\Diamond A\Diamond \ldots \Diamond A$ (the right side of the equation including x number of A's and "x−1" number of "$\Diamond$"s, which each denote an operation in the monoid S"), the above information processing method performs calculation of the expression $A\hat{~}(x+T)$ instead, where $A\hat{~}T=e$.

An eleventh embodiment of the present invention is an information processing method (device) which is a modification of the above first, second, third, or fourth embodiment, wherein the above S, S', or S" is a commutative ring (also a semigroup) of residue classes modulo N (N is a positive integer); the addition operation "+" is addition modulo N, that is, A+B=(A+B) mod N; and the above multiplication operation $\bigcirc$, the operation $\Delta$, or the operation $\Diamond$ (in the following description of the eleventh embodiment, all of the above three operations $\bigcirc$, $\Delta$, and $\Diamond$ are represented by $\bigcirc$) is a modular multiplication modulo N, that is, $A\bigcirc B=A*B \bmod N$.

A twelfth embodiment of the present invention is an information processing method which is a modification of the above sixth or seventh embodiment, wherein the above S, S' or S" is a Mordell-Weil group G (E/Fq) for an elliptic curve E in a finite field Fq, where q=p^n and p is a characteristic (a prime number), and the above operation A or ◊ is addition in the Mordell-Weil group G (E/Fq)

The following embodiments relate to specific methods for dividing the above signal A or B. It should be noted that each of the following embodiments shows both an information processing method and an information processing device to simplify this specification.

A thirteenth embodiment of the present invention is an information processing method or an information processing device which is a modification of the above eleventh embodiment, wherein when the modular multiplication A*B mod N is performed, B is divided such that B[1]=B AND R, B[2]=B AND ~R, B[3]=0, . . . , and B[n]=0, where R is an integer and ~R is its bit inverse.

A fourteenth embodiment of the present invention is an information processing method or an information processing device which is a modification of the above eleventh embodiment, wherein when the modular multiplication A*B mod N is performed, B is divided such that B[1]=V, B[2]= B−V, B[3]=0, . . . , and B[n]=0, where V is an integer equal to or less than B, and n is an integer.

A fifteenth embodiment of the present invention is an information processing method or an information processing device which is a modification of the above eleventh embodiment, wherein when the modular multiplication A^x mod N is performed, x is divided such that x[1]=x AND R, x[2]=x AND ~R, x[3]=0, . . . , and x[n]=0, where R is an integer and ~R is its bit inverse, and n is an integer.

A sixteenth embodiment of the present invention is an information processing method or an information processing device which is a modification of the above eleventh embodiment, wherein when the operation A^x mod N is performed, x is divided such that x[1]=V, x[2]=x−V, x[3]=0, . . . , and x[n]=0, wherein V is a random number equal to or less than x, and n is an integer.

A seventeenth embodiment of the present invention is an information processing method or an information processing device which is a modification of the above thirteenth, fourteenth, fifteenth, and sixteenth embodiments, wherein the integer R or V is changed for each calculation. More specifically, the calculation is performed at a step branching from a step at which a decision is made. And each time the calculation is performed after the decision step, the integer R or V to be used for the calculation is changed. This arrangement enhances the security.

An eighteenth embodiment of the present invention is an information processing method or an information processing device which is a modification of the above fifth embodiment, wherein S is a group of residue classes modulo N (N is a positive integer); the operation ◯ is a modular multiplication modulo N (that is, A◯B=A*B mod N); and the above T is Sf(N), that is, a multiple S of f(N), where f(N) is the Euler's totient function, which indicates the number of integers which are selected from 1, 2, 3, . . . , and N, and which are mutually prime to N, and S is a nonnegative integer.

A nineteenth embodiment of the present invention is an information processing method or an information processing device which is a modification of the above eighteenth embodiment, wherein the above nonnegative integer S is changed for each calculation. More specifically, the calculation is performed at a step branching from a step at which a decision is made. And each time the calculation is performed after the decision step, the nonnegative integer S to be used for the calculation is changed. This arrangement enhances the security.

Next, description will be made of embodiments of the present invention which use elliptic curves.

A twentieth embodiment of the present invention is an information processing method or an information processing device which is a modification of the above twelfth embodiment, wherein when an integer R and its bit inverse ~R are used to calculate kP (which is a scalar multiple k of P, where k is an integer and P is a point on an elliptic curve E), the twentieth embodiment divides k such that k=k[1]+ k[2]+k[3]+ . . . +k[n], where k[1]=k AND R, k[2]=k AND ~R, and k[3]=k[4]= . . . =k[n]=0, and n is an integer.

A twenty-first embodiment of the present invention is an information processing method or an information processing device which is a modification of the above twelfth embodiment, wherein when an integer V equal to or less than k is used to calculate kP (which is a scalar multiple k of P, where k is an integer and P is a point on an elliptic curve E), the twenty-first embodiment divides k such that k=k[1]+ k[2]+k[3]+ . . . +k[n], where k[1]=V, k[2]=k−V, and k[3]= k[4]= . . . =k[n]=0, and n is an integer equal to or more than 1.

A twenty-second embodiment of the present invention is an information processing method or an information processing device which is a modification of the above twelfth embodiment, wherein the above S is set to the Mordell-Weil group G (E/Fq) for the elliptic curve E in the finite field Fq, where q=p^n and p is a characteristic (a prime number), and the operation ◯ is addition in the Mordell-Weil group G (E/Fq). With this arrangement, when kP (which is an integer multiple k of P, where P is a point on the elliptic curve E) is calculated, the twenty-second embodiment calculates kP by the equation kP=(k+SR)P, where R is the order of the point P, that is, RP=0 (the point at infinity), and S is an integer.

In the preferred embodiments of the present invention, it is preferred to change each piece of information used for transformation calculation at all corresponding steps included in each calculation process performed after a decision step. In addition, the above change is typically made for each iteration. However, it is possible to change the information only at a specific step. There are several methods for changing the transformation calculation, such as changing the information to be used itself, and changing the order of the calculation. The following embodiments of the present invention provide these methods.

A twenty-third embodiment of the present invention is an information processing method or an information processing device which is a modification of the above twentieth embodiment and twenty-first embodiment, wherein the value of the integer R or V is changed for each corresponding calculation process.

A twenty-fourth embodiment of the present invention is an information processing method or an information processing device which is a modification of the above twenty-third embodiment, wherein the value of the integer S is changed for each corresponding calculation process.

A twenty-fifth embodiment of the present invention is an information processing method or an information processing device which is a modification of the above first, second, and third embodiments, wherein when B[1], B[2], B[3], . . . , and B[n] which are obtained as a result of dividing B are each processed in a separate calculation process, the order of the contents of each calculation process is changed.

A twenty-sixth embodiment of the present invention is an information processing method or an information processing device which is a modification of the fourth embodiment, wherein when k[1], k[2], k[3], . . . , and k[n] which are obtained as a result of dividing k are each processed in a separate calculation process, the order of the contents of each calculation process is changed.

A twenty-seventh embodiment of the present invention is an information processing method or an information processing device which is a modification of the above twenty-fifth embodiment, wherein S is a commutative ring (also a semigroup) of residue classes modulo N (N is a positive integer); the addition operation "+" is addition modulo N, that is, A+B=(A+B) mod N; and the operation $\bigcirc$ is a modular multiplication modulo N, that is, A$\bigcirc$B=A*B mod N.

A twenty-eighth embodiment of the present invention is an information processing method or an information processing device which is a modification of the above twenty-sixth embodiment, wherein S is a commutative ring (also a semigroup) of residue classes modulo N (N is a positive integer); the addition operation "+" is addition modulo N, that is, A+B=(A+B) mod N; and the operation $\bigcirc$ is a modular multiplication modulo N, that is, A$\bigcirc$B=A*B mod N.

A twenty-ninth embodiment of the present invention is an information processing method or an information processing device which is a modification of the above twenty-sixth embodiment, wherein S is a Mordell-Weil group G (E/Fq) for an elliptic curve E in a finite Fq, where q=P^n and P is a characteristic (a prime number), and the operation $\bigcirc$ is addition in the Mordell-Weil group G (E/Fq). As described in the above embodiments, the information processing devices and information processing methods of the present invention are typically applied to cards as represented by the IC card.

The major preferred embodiments of the present invention were described above. The following description outlines specific methods for applying the present invention to cards.

A semiconductor integrated circuit device incorporating the information processing device described above can be applied to a card so as to provide the card with high security. Cards are of two types: the contact type and the contactless type. The preferred embodiments of the present invention can be applied to the both types.

The above chip (semiconductor integrated circuit device) operates according to a signal supplied from the outside, for example, from a terminal.

Figure 21:
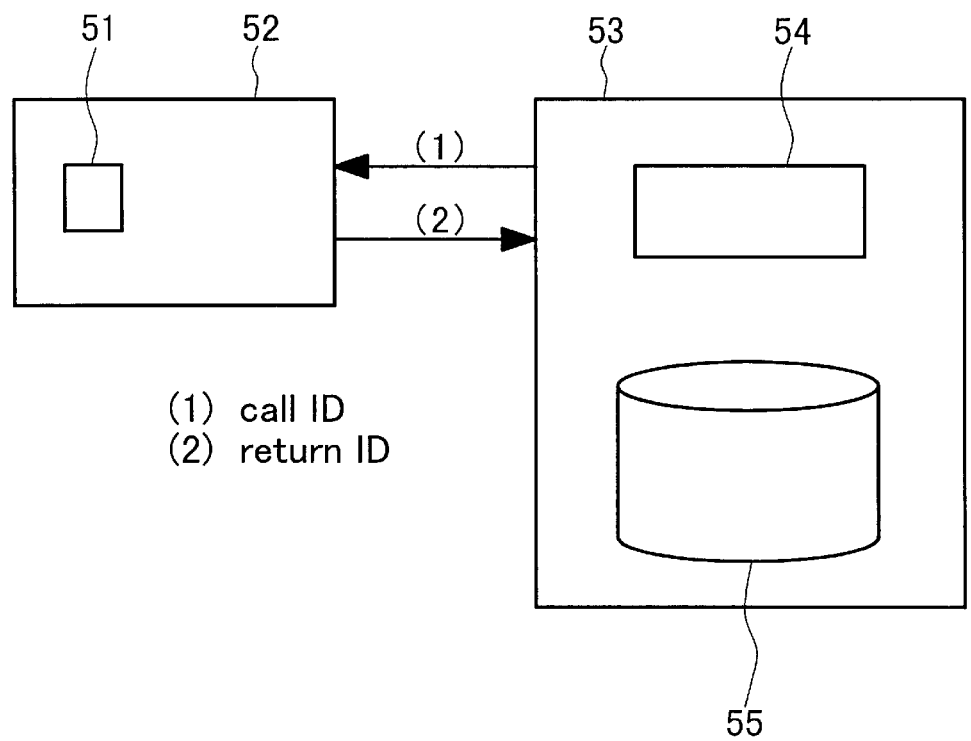
FIG. 21 is a schematic diagram showing the configuration of a card system.

It should be noted that a terminal of a type used for a general card system is enough as the above terminal. Brief description will be made of the operation of a card system. FIG. 21 illustrates the concept of the card system.

An IC card 52 includes a chip 51, and exchanges data with a reader/writer 53. The reader/writer 53 includes a control processor 54 and a magnetic disk 55 used as a database. To begin with, the reader/writer 53 issues to the IC card 52 an inquiry as to an ID. For example, the reader/writer 53 makes an inquiry to the IC card 52 as to an ID such as a name code or an identification code specifying a person in charge of managing the IC card. This step is indicated by reference numeral (1) in FIG. 21. This name code or identification code is stored in a predetermined area in the IC chip. In response to the inquiry, the IC card sends the name code to the reader/writer. This step is indicated by reference numeral (2) in FIG. 21. The reader/writer searches the database 55 for the name code to obtain the corresponding key code stored in the database.

The reader/writer sends a random number to the IC card. This random number is generated in an MPU within the reader/writer by means of hardware. The random number also can be supplied from the server side via a LAN, etc. After receiving the random number, the IC card receives a command from the reader/writer, and according to the command, the IC card generates another random number obtained as a result of encrypting the received random number by use of a key code generated by a key code generator.

The reader/writer also encrypts the same random number as that sent to the IC card using the key code obtained from the database. The encrypted random number obtained by the reader/writer is compared with the encrypted random number obtained by the IC card. If they coincide, it is determined that the IC card is valid, completing the mutual authentication between the IC card and the reader/writer.

As described above, in this system, upon receiving the key code, the reader/writer searches for the same key code and its corresponding ID stored in a magnetic disk. In this way, the validity of the ID is verified.

The generated key code (ID code) of each IC card is stored in a database together with the name code or the identification code.

The generated key code can be used to authenticate the card holder, check whether the IC card has been forged, or carry out mutual authentication between the IC card and the reader/writer when the IC card is used as electronic money.

The above system can be applied to a number of fields such as payment at a general store, purchase of a ticket, examination of a commutation ticket, checking of a driver's license, and a telephone call using a telephone card.

The cards and the card systems described above can be realized using the following preferred embodiments of the present invention.

Each preferred embodiment of the present invention will be concretely described below.

The present embodiment is described using as examples the RSA cryptography and the elliptic curve cryptography which are representative of the public-key cryptography (asymmetric cryptography) even though the present embodiment can be applied to other cryptographic methods.

The RSA cryptography in general is substantially described in a book entitled "Introduction to Cryptography" authored by E. Okamoto and published by Kyoritsu Syuppan, and another book entitled "Handbook of Applied Cryptography" authored by A. J. Menezes, P. C. Van Ooschot, and S. A. Vanstone and published by CRC-Press. The elliptic curve cryptography in general, on the other hand, is substantially described in the book "A Course in Number Theory and Cryptography: Graduate Texts in Mathematics 114 (Second Edition)" authored by N. Koblitz, who devised this cryptographic method, and published by Springer-Verlag in 1987. The operation on elliptic curves is detailed in the book "Rational Points on Elliptic Curve" authored by J. H. Silverman and J. Tate and published by Springer-Verlag in 1992, while algebra in general, including groups, rings, and fields is substantially described in the book "Introduction to Algebra" authored by K. Matsuzaka and published by Iwanami Shoten.

In the public-key cryptography (asymmetric-key cryptography), secret information is generally included in a public key, and the public-key cryptography is based on the fact that it takes an extremely long time (and therefore it is not practical) to deduce the secret information from the public key by computation, providing computational security. The problem of factorization into prime numbers and the problem of discrete logarithm in a group are typical problems used for providing such computational security for the public-key cryptography. The RSA cryptography uses the former problem, while the elliptic curve cryptography uses the latter by applying it to a group on an elliptic curve.
<Application to RSA Cryptography>

To begin with, brief description will be made of the RSA cryptography as a basic cryptographic method to which the present invention is applied.

In the RSA cryptography, the product n of two large prime numbers p and q (for example, two 512-bit prime numbers) is calculated (that is, n=pq). After that, a number e mutually prime to n is selected and registered with a public-key list as a public key. In IC cards, the above number e mutually prime to n is often set to be a number of 3 or 65537.

The data (plaintext) is encrypted as follows.

A transmitter B encrypts data (plaintext) y expressed in numbers equal to 1 or larger than 1 but not larger than N−1 by use of the formula R=y^e mod n, where the expression "y^e" indicates y to the e-th power, and transmits the ciphertext R to a holder A of the above public key.

Upon receiving the ciphertext R, the public-key holder A calculates R^x mod n, where x denotes a secret key and xe mod (p−1)(q−1)=1. It should be noted that the secret key x is generally stored in the semiconductor chip mounted on a card.

The expression (p−1)(q−1) is the value of the Euler's totient function f(N) for N, which is equal to the number of natural numbers mutually prime to N. According to Euler theorem, the equation $$R\char`\^((p-1)(q-1)) \bmod n=1 \text{ holds.}$$

On the other hand, since the above equation xe mod (p−1)(q−1)=1 can be expressed as $$xe=1+k(p-1)(q-1),$$

where k is an integer, the following equations hold.

$$R\char`\^x \bmod N = y\char`\^(xe) \bmod n = y\char`\^(1+k(p-1)(q-1)) \bmod n = y*y\char`\^(k(p-1)(q-1)) \bmod n = y$$

Accordingly, the public-key holder A decrypts the plaintext y sent from the transmitter B by calculating the expression R^x mod n.

As described above, the secret key x is produced through a calculation using the product n of the two large prime factors p and q. No method has so far been known to be capable of deducing x without using factorization. Since factorizing the product of large prime numbers takes an unrealistic amount of time, the factorization of the product n is practically impossible. Therefore, even if the product n of the two large prime numbers is made public, the secret key of the public-key holder A is secured.

The operations employed in the RSA cryptography can be regarded as those on an integer residue class ring Zn modulo n.

Figure 4:
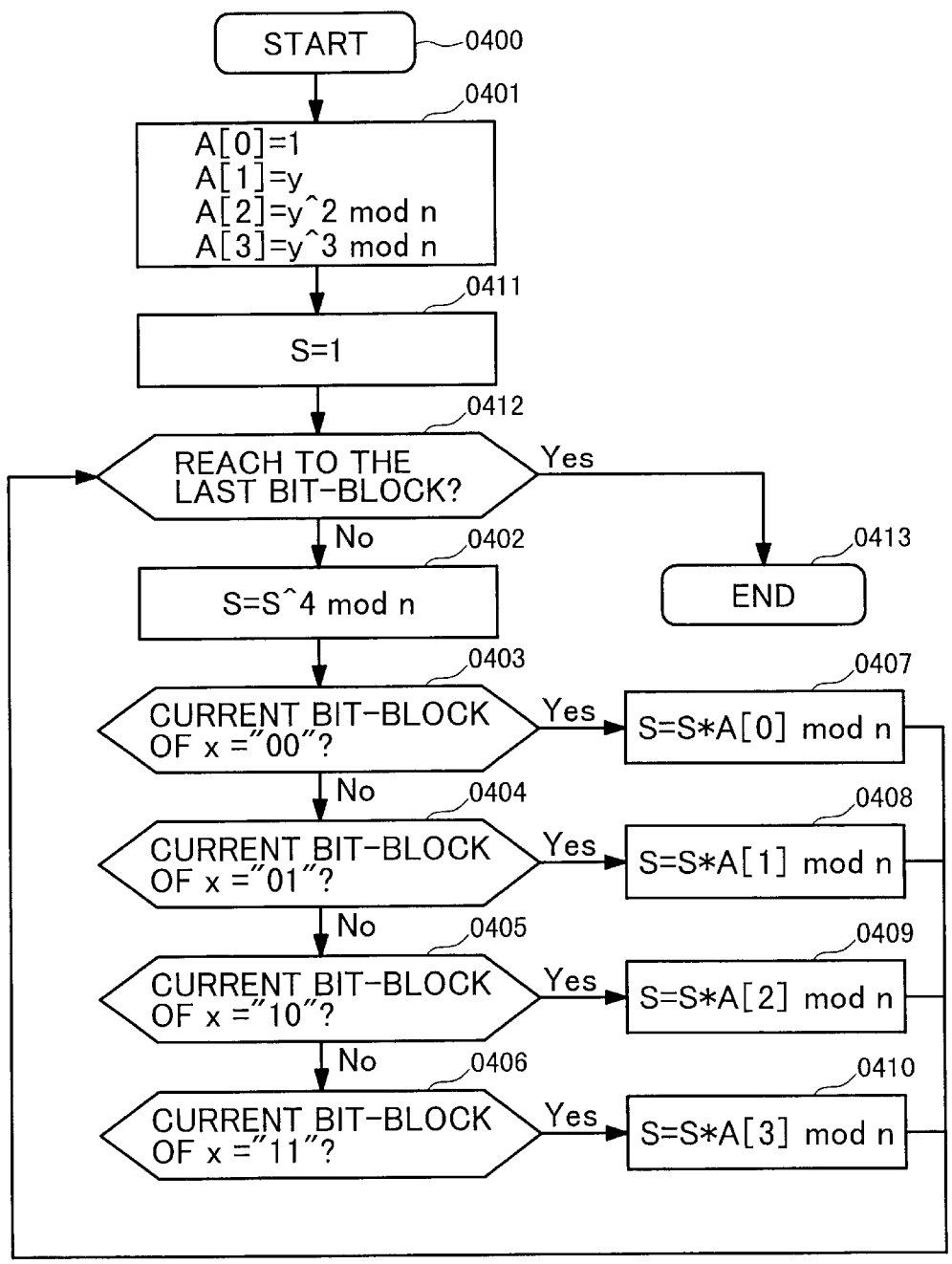
FIG. 4 is a flowchart showing a process of a modular exponentiation.

Furthermore, the operations employed in the RSA encryption/decryption are referred to as modular exponentiations. FIG. 4 is a flowchart showing an example of an algorithm generally implemented on a computer to perform modular exponentiation. Important points of the calculation flow in FIG. 4 performing the operation y^x mod n are described as follows.

At step 0401, the encryption calculation according to the present invention starts.

(1) The secret key x is read in units of a desired number of bits, for example, for every two bits. If the read two bits (a bit block of two bits) are "00", the variable A[0] (which stores a value of 1) is assigned to the bit block. Similarly, depending on whether the read bit-block is "01", "10", or "11", the variable A[1] (which stores the value of the expression "y"), A[2] (which stores the value of the expression "y^2 mod n"), or A[3] (which stores the value of the expression "y^3 mod n") is assigned to the read bit-block, respectively.

(2) Modular multiplication using one of the above variables A[0], A[1], A[2], and A[3] is performed.

It should be noted that the secret key x is divided in units of two bits in the above description for simplification. The secret key x may be divided in units of any arbitrary number of bits, such as one bit, three bits, or four bits. However, the same calculation method is employed in any case. When the secret key x is divided in units of j bits, the calculation is carried out 2^j times (2^j times). This process of dividing the secret key x for every j bits (or every arbitrary number of bits) is referred to as dividing the secret key x using a window width.

The following preferred embodiments of the present invention also use this calculation method even though not indicated as such.

In the calculation flow, the fourth-power operation at step 0402 is performed regardless of the number of bits making up the bit block. In the subsequent modular multiplication, four decision steps, 0403, 0404, 0405, and 0406 are provided so that the flow branches out into four steps 0407, 0408, 0409, and 0410, respectively. Each decision step determines whether the value of a bit block (of two bits in this case) to be checked is equal to that assigned to the decision step. The modular multiplication at one of steps 0407, 0408, 0409, and 0410 is performed depending on the value of the bit block. The modular multiplications at steps 0407, 0408, 0409, and 0410 are different from one another as to which variable (A[0], A[1], A[2], or A[3]) is assigned to them. The values of the variables A[0], A[1], A[2], and A[3] are stored in the table prepared at step 0401.

Generally, modular multiplication requires a significant amount of processing power, consuming an extremely large current. Especially in a calculation using data of a large bit-width, it may be possible to deduce which one of A[0], A[1], A[2], and A[3] is currently being processed. Suppose that a 16 bit wide operation is to be performed, for simplification. Let y=58981 and n=59989(=239*251). A[0], A[1], A[2], and A[3] are expressed as the following binary-bit strings.

A[0]=0000000000000001
A[1]=0011001010011000
A[2]=1011001011001110
A[3]=1001111110010101

Accordingly, each bit string produces a different current waveform, which can be observed by measuring the current consumed in the IC card. Based on differences between such current waveforms, four different current waveform patterns may be obtained from which to derive the bit pattern of the secret key. Specifically, based on the four different current waveforms, the bit pattern of the secret key can be obtained by making a number of attempts equal to all possible permutations of the current waveform patterns, that is, 4!=24 (patterns). Even when the number of bits of modulus n is increased, the same method can be used.

It should be noted that since the implementation of this modular multiplication requires a significant amount of processing power, a dedicated coprocessor is used for this operation instead of the built-in CPU in many IC cards.

This attack method is very effective when the number of bits of the modulus n is increased. For example, when the modulus n is set to a number having 2048 bits, it is practically impossible to factorize the modulus n. However, if the current consumed in the IC chip can be observed by use of an oscilloscope, the bit pattern of the secret key may be derived. For example, the following procedure may be used to find the value of x (having about 2000 bits). First, classify the consumed currents into four types. At that time, the bit value of each consumed current is divided into bit blocks (if each bit block is set to have 2 bits, there are about 1000 bit blocks) for comparison. Next, perform a modular exponentiation on each of the four types using another computer. Then, compare the result of each modular exponentiation with the output of the IC chip to see whether they coincide. This comparison requires only 24 attempts. Accordingly, the considerable possibility of confidential data being derived is left open in the above conventional encryption method in which data (plaintext) y is encrypted by use of the above formula R=y^e mod n, and a secret key is applied.

As described above, the preferred embodiments of the present invention are provided to protect the secret key against such an attack.

(Division of Input Data)

Description will be made of a first method according to the present invention for scrambling currents in an IC card by dividing the input data.

It should be noted that the following description illustrates each calculation algorithm and its major implementation methods. There may be other implementation methods in addition to those described below, depending on each calculation algorithm. However, the implementation methods for this first method of the present invention can be also satisfactorily applied to other methods of the present invention described below.

To exchange ciphertext by use of a secret key, the present invention employs a conventional method. That is, the receiver B of ciphertext generates two keys by use of a predetermined cryptographic method. One of them is a "secret key" dedicated for decryption. It is held by the receiver B itself and used to decrypt ciphertext. The other is a "public key" to be sent to a transmitter A that sends the ciphertext. The receiver B sends the public key to the transmitter A as required, or alternatively the receiver B makes the public key public beforehand. The receiver B decrypts transmitted ciphertext by use of the secret key. The above method for exchanging ciphertext is also employed by other methods (described below) of the present invention for scrambling currents in an IC card. In the first method, the secret key x is stored in, for example, a storage means of a semiconductor chip, such as an EEPROM in the storage unit.

Figure 5:
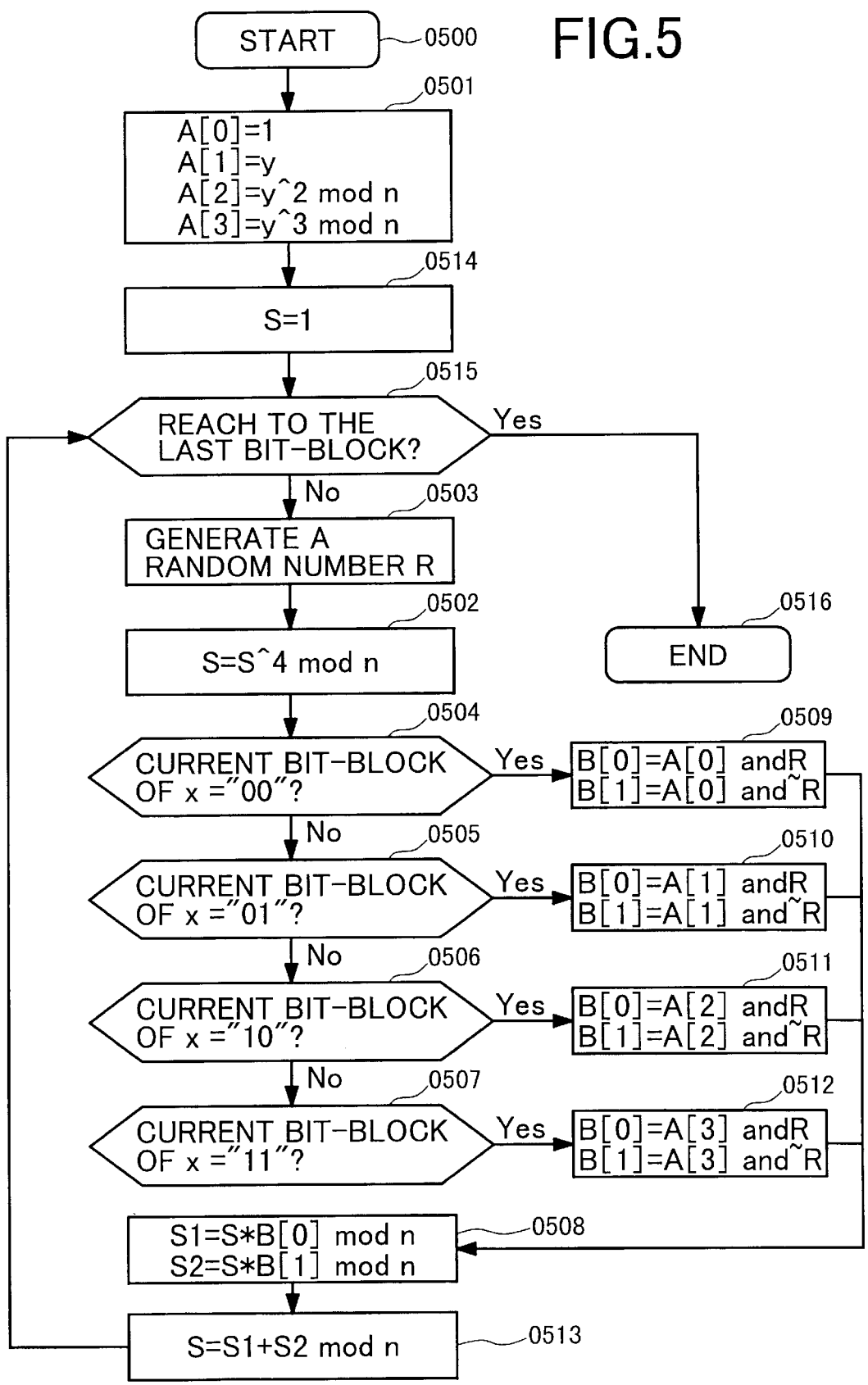
FIG. 5 is a flowchart showing a process of scrambling currents in an IC card by dividing the input data.

FIG. 5 is a flowchart showing encryption and decryption operations according to the first method.

As described in the above general encryption of plaintext, the transmitter A encrypts data y by use of the formula y^e mod n (=R), and transmits the encrypted data to the receiver B.

Receiving this ciphertext R, the receiver B calculates the expression R^x mod n (=y) using a secret key x. The value of the secret key x is determined by, for example, the equation x^x mod (p−1)(q−11)=1. As can be seen from the above description, the encryption and the decryption use similar calculation methods. FIG. 5 is a flowchart showing a process of an encryption operation on data y. A similar process is used to decrypt the transmitted encrypted data R.

At step 0500, the encryption calculation of the first method starts.

(1) A secret key x generated beforehand is divided in units of a desired number of bits, for example, for every two bits (a bit block). The variables A[0], A[1], A[2], and A[3] are each assigned the value of a predetermined different modular exponentiation. For example, A[0]=1, A[1]=y, A[2]=y^2 mod n, and A[3]=y^3 mod n. These variables and values are listed in a table. Furthermore, all possible values of the bit block are each assigned to one of the variables. For example, the value "00" is assigned to A[0]. Similarly, the values "01", "10", and "11" are assigned to A[1], A[2], and A[3], respectively. This arrangement is the same as that described above. (step 0501)

Each of the above operations is carried out by the central processing unit (CPU) or a coprocessor in an IC. The operation results are stored in a storage means, for example, generally a RAM in a data storage unit. The stored operation results (data) are retrieved from the storage means as necessary for calculation.

(2) An operation result S is initialized to 1 at step 0514.

(3) A random number R for scrambling is generated. In this case, a pseudorandom number may be used as the random number R. It should be noted that the random number R must be set to have a number of bits substantially equal to the number of bits of n. (step 0503)

This random number R is generated by the CPU. Alternatively, the random number R may be generated in another special area in the IC. The generated random number is generally stored in a data storage unit. The generated random number may be directly used for an operation instead of being stored in the data storage unit. Conventional methods for generating a random number and applying it to calculations in encryption can be satisfactorily applied to the present invention.

(4) An operation using the fourth power of S is performed. Specifically, the operation S=S^4 mod n is carried out. The secret key x (its bit value) is not involved in this operation. (step 0502)

(5) It is determined which decision step corresponds to each bit block obtained as a result of dividing the secret key x. That is, it is determined whether each bit block is "0", "01", "10", or "11". (steps 0504, 0505, 0506, and 0507)

(6) The random number R for scrambling is used to perform transformation calculation of the table values.

The table values of A[0], A[1], A[2] and A[3] are each transformed and set for B[0] and B[1] as follows.

When the bit-block value is "00", the operations B[0]=A[0] AND R and B[1]=A[0] AND ~R are performed as transformation calculations. (step 0509)

When the bit-block value is "01", the operations B[0]=A[1] AND R and B[1]=A[1] AND ~R are performed as transformation calculations. (step 0510)

When the bit-block value is "10", the operations B[0]=A[2] AND R and B[1]=A[2] AND ~R are performed as transformation calculations. (step 0511)

When the bit-block value is "11", the operations B[0]=A[3] AND R and B[1]=A[3] AND ~R are performed as transformation calculations. (step 0512)

Each of the above operations is carried out by the central processing unit (CPU) or a coprocessor in an IC. The operation results are stored in a storage means, for example, generally a RAM in a data storage unit. The stored operation results (data) are retrieved from the storage means as necessary for calculation.

The transformation calculations at steps 0509, 0510, 0511, and 0512 in FIG. 5 randomly divide the original data A[j] (j=0,1,2,3,4). It should be noted that pseudorandom numbers may be used to randomly divide the original data.

As in the above example, let y=58981 and n=59989(=239*251). The table values for A[0], A[1], A[2], and A[3] are expressed as the following binary-bit strings.

A[0]=0000000000000001
A[1]=0011001010011000
A[2]=1011001011001110
A[3]=1001111110010101

Let R=1001100110010101. If the bit-block value is the binary number "10", A[2] is selected and thereby the following transformed values are obtained.

B[0]=1001000010000100
B[1]=0110011001101010

Since the current value "1" of A[0] has little scrambling effect, a value of 1+n may be set for A[0].

(7) By using B[0] and B[1] thus obtained, the following operations are performed at step 0508.

S1=S*B[0] mod n
S2=S*B[1] mod n

Since the above calculation process consumes a large current, an attacker observing the current may try to derive the secret key from its value. However, since the data (secret key) is randomly divided, the attacker only observes current waveforms different from those of the original data. This confuses the attacker. If the attacker tries to observe the waveforms more accurately by statistically processing them, this only leads to further confusion (effectively confusing the attacker) since the random number employed changes for each iteration.

(8) The above operation results S1 and S2 are combined as follows. Even after all of the above operations have been performed, the equation B[0]+B[1]=A[2] still holds. Therefore, lastly the operation at step 0513 in FIG. 5 is performed since $$S1+S2 \bmod n = S*(B[0]+B[1]) \bmod n = S*A[2] \bmod n.$$

(9) It is determined whether all the bit blocks have been checked for transformation calculation, at step 0515. If all the bit blocks have been checked, the encryption process ends, producing the proper data to be transmitted at step 0516.

The encrypted data to be transmitted thus obtained is generally stored in, for example, a RAM temporarily. The data is output from an input/output port as necessary. The input/output operation of a card system was already schematically described above with reference to FIG. 21.

The receiver decrypts the transmitted encrypted data using the same method as that described above and employing the formula R^x mod n (=y), where R is the transmitted encrypted data.

It should be noted that even though the above method (the first method of the present invention) for dividing input data divides only the signal A, it is possible to divide both signals A and B. In this case, the expression ΣA[i]⊙B[j] is calculated, where i=1, . . . , m and j=1 . . . , n.

Figure 6A:
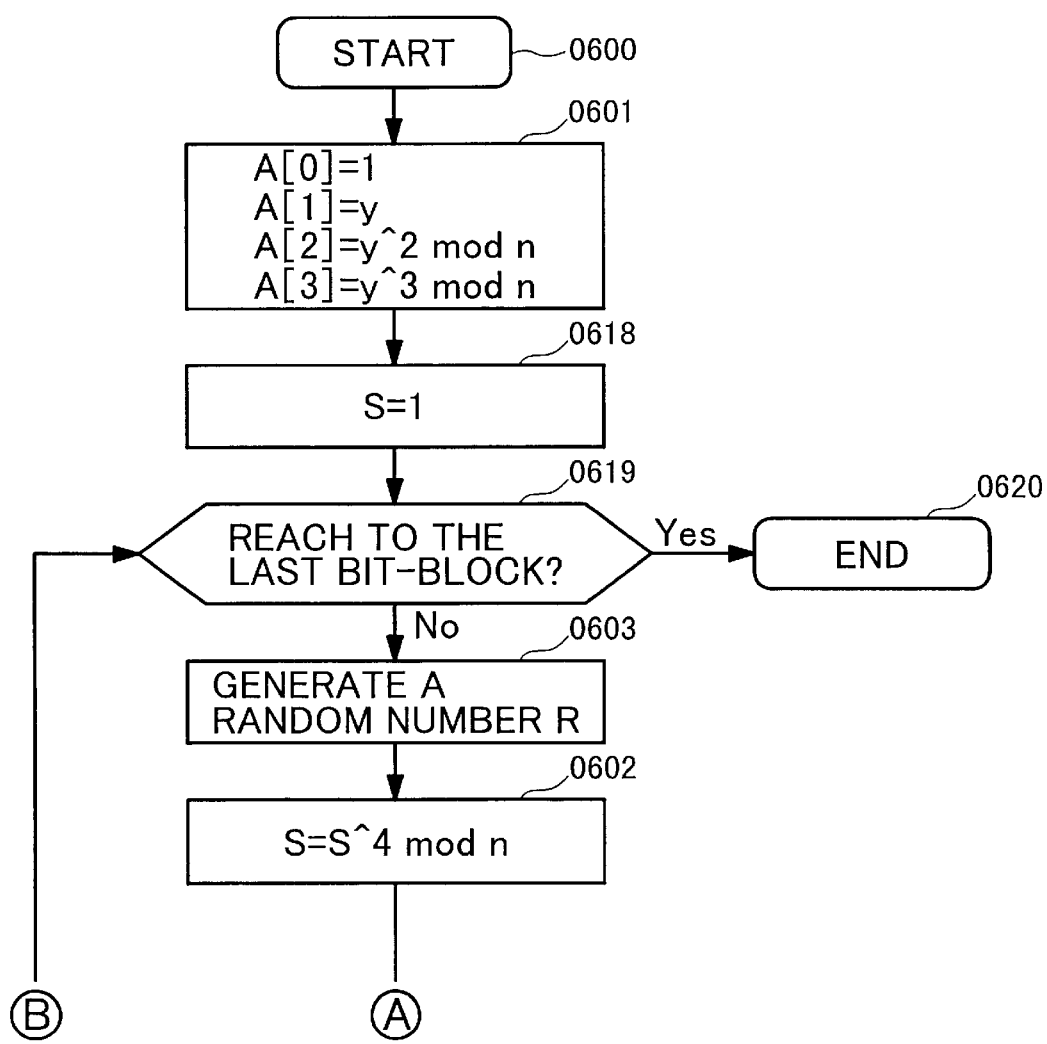
FIG. 6A is a flowchart showing the first part of another process of scrambling currents in an IC card by dividing the input data.
Figure 6B:
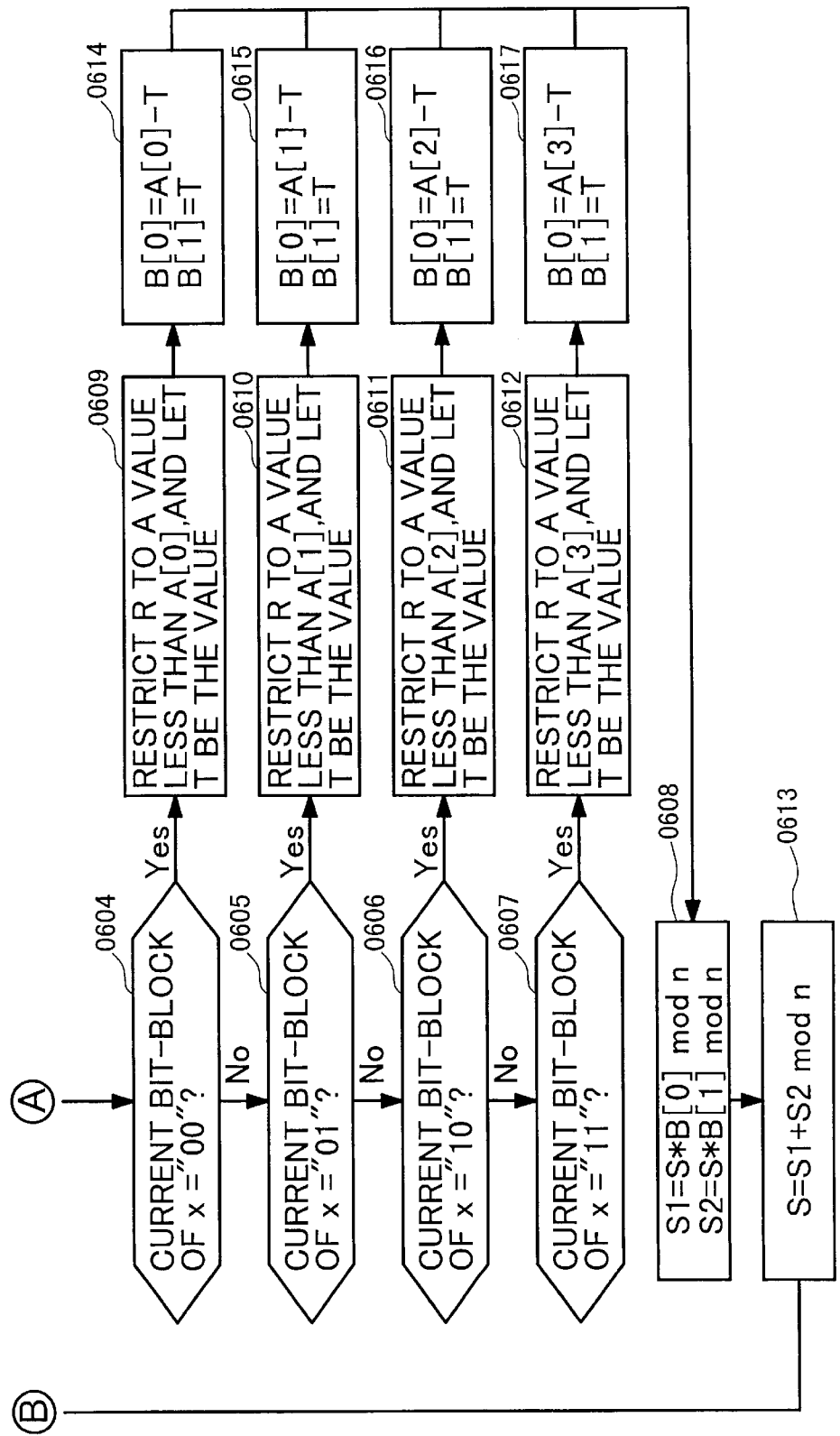
FIG. 6B is a flowchart showing the second part of the above another process of scrambling currents in an IC card by dividing the input data.

Next, description will be made of a second method of the present invention for scrambling currents in an IC card by dividing the input data. FIGS. 6A and 6B are flowcharts showing another process of scrambling currents in an IC card by dividing the input data. It should be noted that FIG. 6A shows the first part of the flowchart, while FIG. 6B shows the second part. They are linked together at (A) and (B). This method uses an operation which restricts the random number R to less than a certain value. It should be noted that process steps of the second method different from those of the above first method will be mainly described below.

Also in this method, the transmitter A encrypts data y by use of the formula y^e mod n, and transmits the encrypted data to the receiver B. Receiving the ciphertext R, the receiver B calculates the expression R^x mod n using a secret key x. The value of the secret key x is determined by, for example, the equation xe mod (p−1)(q−1)=1.

As in the example of FIG. 5, the process shown in FIGS. 6A and 6B takes the following steps.

The calculation starts at step 0600.

(1) A table is prepared at step 0601.

(2) Initialization is carried out for the calculation at step 0618.

(3) A random number R for scrambling is generated at step 0603 (this random number R has a number of bits substantially equal to the number of bits of n).

(4) The fourth-power operation S=S^4 mod n is performed at step 0602.

Up to this step, the secret key x (its bit value) is not involved in the calculation.

(5) Depending on the value of each bit block obtained as a result of dividing the secret key x, it is determined which decision step corresponds to each bit block, that is, whether the value of each bit block is "00", "01", "10", or "11". (steps 0604, 0605, 0606, and 0607)

Next, the random number R for scrambling is used to perform transformation calculation of the table values. That is, this second method of the present invention performs the following operations.

(6) The value of the random number R is restricted to less than a certain value determined depending on the value of each bit block.

When the value of a bit block is "00", the random number R restricted to less than the value of A[0] is set for a variable T. Similarly, depending on whether the value of a bit block is "01", "10", or "11", the random number R restricted to less than the value of A[1], A[2], or A[3] is set for T, respectively. (steps 0609, 0610, 0611, and 0612)

(7) By using T whose value was determined as described above, the following operations are performed which each correspond to a respective decision step (condition).

That is, using T, the value of A[j] (j=0,1,2,3) is randomly divided by the operations B[0]=A[j]−T and B[1]=T. (steps 0614, 0615, 0616, and 0617)

(8) By using B[0] and B[1] thus obtained, the following operations are performed at step 0608.

S1=S*B[0] mod n
S2=S*B[1] mod n

Since the above operation process consumes a large current, an attacker observing the current may try to derive the secret key from its value. However, the input data is randomly divided (this division may be made by use of pseudorandom numbers). Therefore, the attacker only observes current waveforms different from those of the original data. This confuses the attacker. Especially, if the attacker tries to observe the waveforms of the consumed currents more accurately by statistically processing the waveforms, this only leads to further confusion (effectively confusing the attacker) since the random number employed changes for each iteration.

(9) The above operation results S1 and S2 are combined at step 0613 as follows. The equation S1+S2 mod n=S*(B[0]+B[1]) mod n=S*A[j] mod n holds since B[0]+B[1]=A[j]. Therefore, the operation S=S1+S2 mod n is performed at step 0613 to produce the final proper result (data) to be transmitted.

It should be noted that to decrypt the transmitted encrypted data, it is only necessary to use the same method as that described above and employ the formula R^x mod n (=y), where R is the transmitted encrypted data.

(Division of a Secret Key)

Description will be made of a method for scrambling currents in an IC card by dividing a secret key instead of the input data. This method of dividing a secret key has no effect in scrambling the currents if each current is directly observed (that is, if each single waveform of a consumed current is observed). However, this method is effective in hiding information if many waveforms are gathered and subjected to statistical processing.

First, description will be made of an example to which the RSA cryptography is basically applied. As described above, FIG. 4 shows RSA encryption/decryption operations.

Figure 7A:
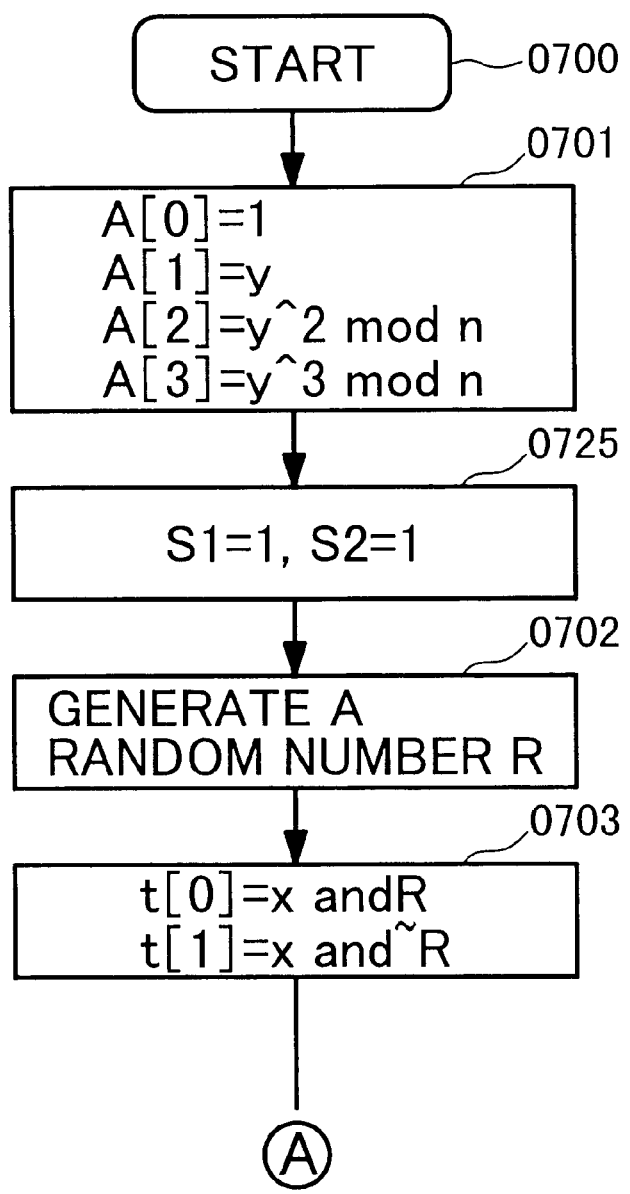
FIG. 7A is a flowchart showing the first part of a process of scrambling currents in an IC card by dividing the key (secret exponent)
Figure 7B:
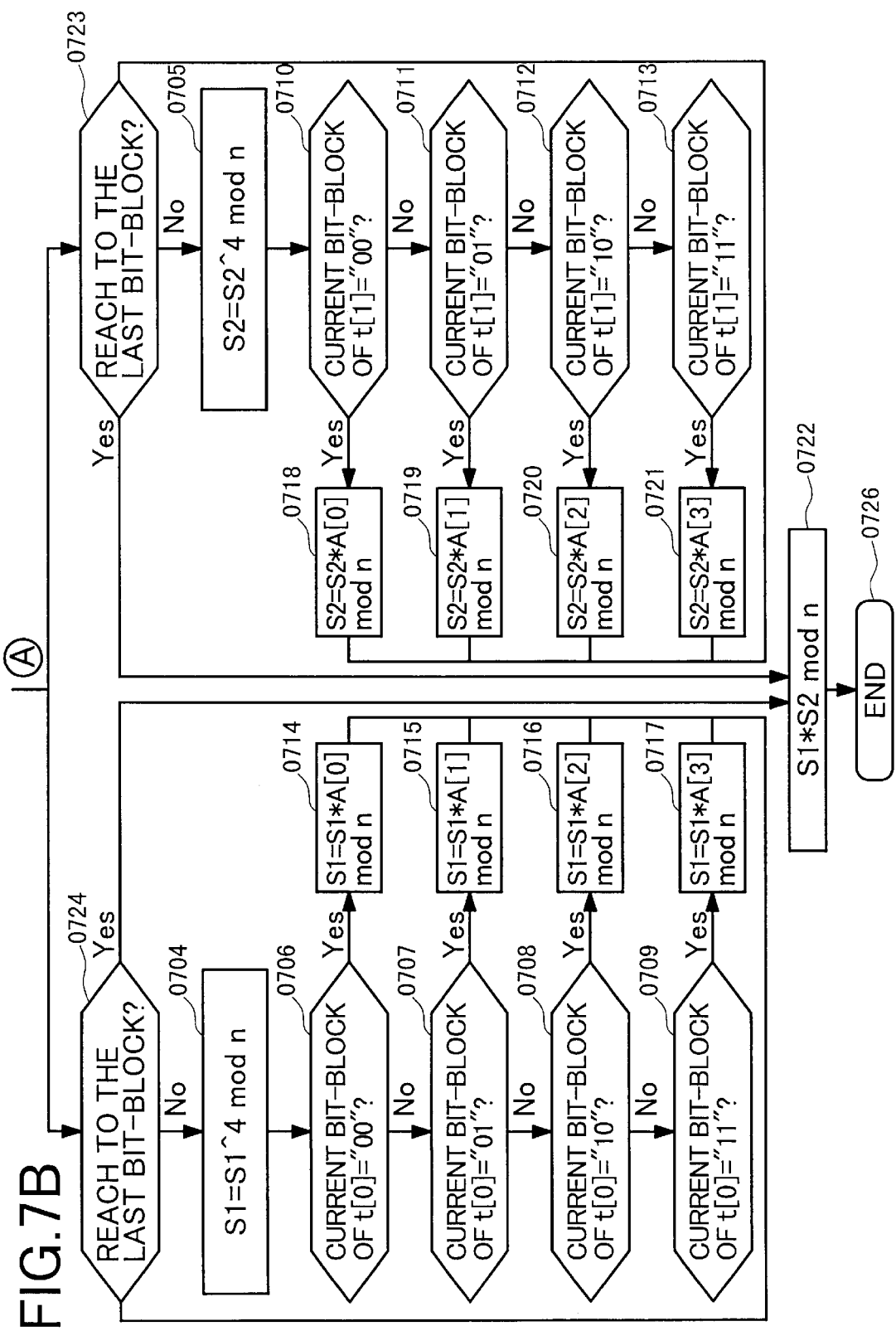
FIG. 7B is a flowchart showing the second part of the above process of scrambling currents in an IC card by dividing the key (secret exponent)

First, it should be noted that to successfully derive a secret key by use of statistical processing, each bit value of the secret key must remain the same during the statistical processing. This means that if the secret key is randomly divided (this division may be made by use of pseudorandom numbers), such processing can be confused (by scrambling the secret key). FIGS. 7A and 7B are flowcharts showing a process of scrambling currents in an IC card by dividing the secret key (secret exponent). It should be noted that FIG. 7A shows the first part of the above process, while FIG. 7B shows the second part. They are linked together at (A).

The process shown in FIGS. 7A and 7B takes the following steps.

(1) As in the above process shown in FIG. 4, after the calculation starts at step 0700, a table is prepared to store the values of expressions each assigned to a respective one of the variables A[0], A[1], A[2], and A[3], at step 0701.

(2) Then, initialization is carried out by letting S1=1 and S2=1. The variables S1 and S2 are each provided to hold a value obtained as a result of calculation using a respective one of two divided secret keys. (step 0714)

(3) A random number R for scrambling is prepared. In this case, a pseudorandom number may be used as the random number R. (step 0702)

(4) The secret key x is divided into two divided secret keys using the random number R for scrambling as follows. (step 0703)

t[0]=x AND R t[1]=x AND ~R, where ~R is the bit inverse of R.

The two divided secret keys t[0] and t[1] are each used to perform respective modular exponentiations. The process of these modular exponentiations is the same as that of the ordinary one as illustrated below.

(5) To begin with, the fourth-power operations S1=S1^4 mod n and S2=S2^4 mod n are performed at steps 0704 and 0705.

(6) It is determined which decision step corresponds to each bit block obtained as a result of further dividing the above divided secret keys t[0] and t[1] for every two bits, starting from the bit block of the most significant two bits of one of the divided secret keys, and sequentially checking one bit block after another. The above determination is made based on the value of each bit block, that is, whether the value of each bit block is "00", "01", "10", or "11". (steps 0706, 0707, 0708, 0709, 0710, 0711, 0712, and 0713)

(7) The following modular multiplications are performed using the above S1 and S2, and the values stored in the table prepared at step 0701. (steps 0714, 0715, 0716, 0717, 0718, 0719, 0720, and 0721)

S1=S1*A[j] mod n, where j=0,1,2,3.

S2=S2*A[j] mod n, where j=0,1,2,3.

(8) If all the bit blocks have been checked, the final values of S1 and S2 are obtained. (steps 0723 and 0724)

(9) Lastly, the operation S1*S2 mod n is performed at steps 7025 and 7026.

Since t[0]+t[1]=x, the equation S1*S2 mod n=y^x mod n holds. The right side of the equation is the original encryption formula for data to be transmitted.

To successfully perform statistical processing of current waveforms, each bit value of the secret key must remain the same how many times the corresponding process is performed. The simplest example of the statistical processing is averaging of waveforms to remove noise components from them. This method of removing noise is widely used. Actually, many digital oscilloscopes have a function to average waveforms. In the ordinary encryption process shown in FIG. 4, whenever same data is input, same current value is output except for its noise components. This means that the noise components can be removed by gathering many current waveforms of the same input data and averaging them. This method is based on the law of large numbers that the means of a large number of samples, which are independent and vary according to identical distributions, of a stochastic variable are approximately equal to the theoretical mean of the samples. Actually, a current observed on an oscilloscope can be considered to include current noise whose mean value is zero. Such an assumption is valid since a nonzero mean value of the current noise indicates that the current includes some DC component.

On the other hand, consider a case in which an attacker observing the currents knows the fact that the process of scrambling the currents shown in FIGS. 7A and 7B has already been carried out. The attacker can derive the proper key by obtaining t[0] and t[1] to calculate S1 and S2, and adding them at the final step. However, it is generally difficult to remove current noise by hardware alone, that is, it is difficult to fully specify the keys t[0] and t[1] by observing only a single current waveform. Therefore, it is necessary to obtain a plurality of waveforms in order to enhance the accuracy. However, in the process shown in FIGS. 7A and 7B, the random number R changes every time the current is measured, thereby changing the values of t[0] and t[1]. As a result, obtaining many waveforms to average them only produces a confused result since the obtained waveforms each correspond to a different exponent, making it difficult to extract any meaningful information from them.

Description will be made of another method (a third method) for scrambling the currents by dividing the key (Secret Exponent).

Figure 8A:
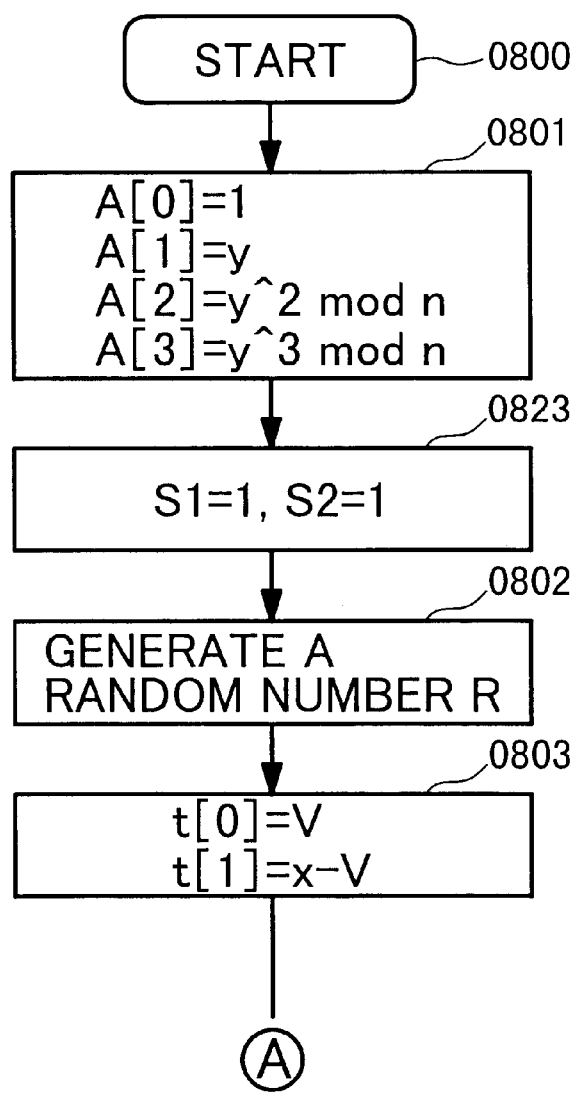
FIG. 8A is a flowchart showing the first part of another process of scrambling currents in an IC card by dividing the key (secret exponent)
Figure 8B:
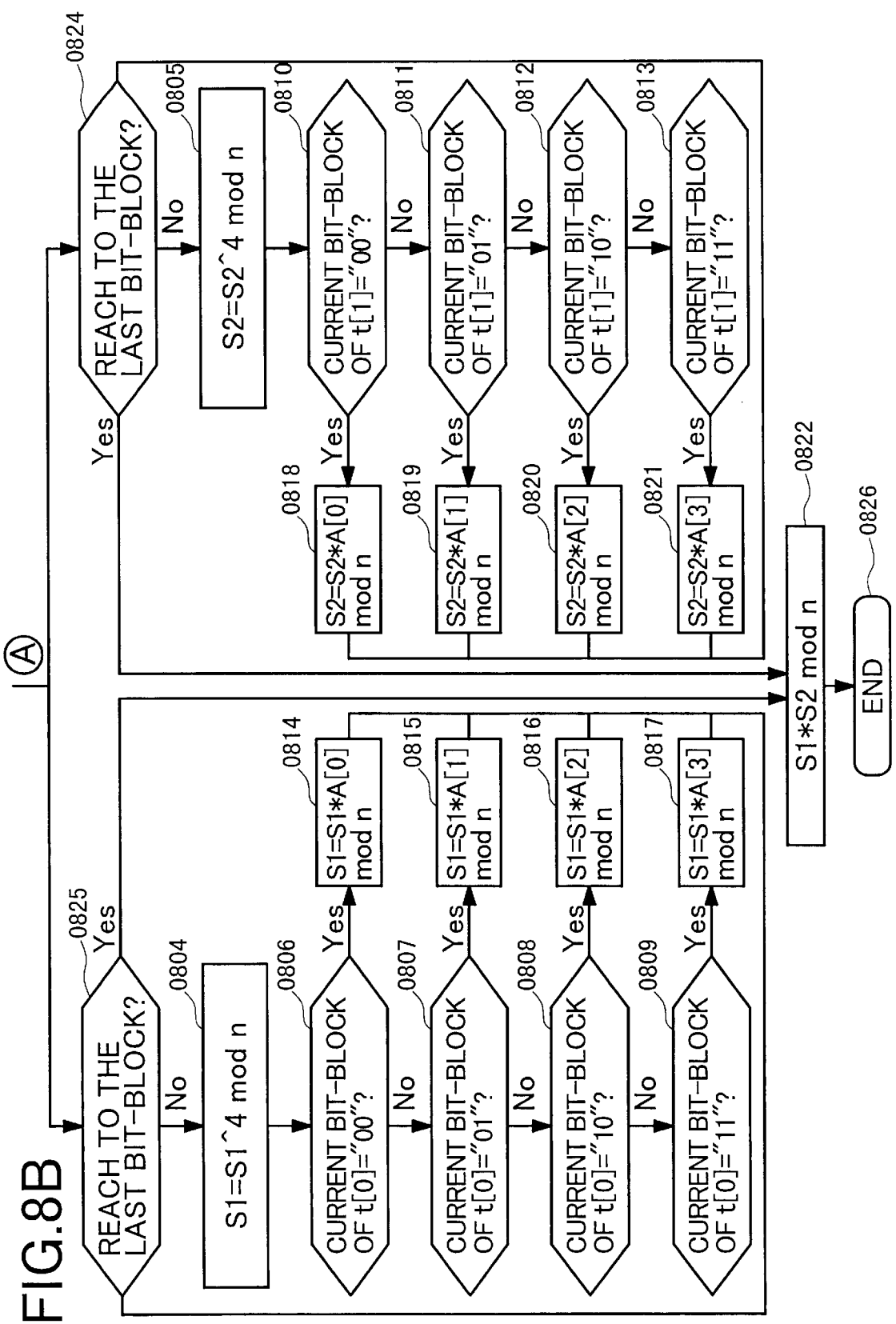
FIG. 8B is a flowchart showing the second part of the above another process of scrambling currents in an IC card by dividing the key (secret exponent)

FIGS. 8A and 8B are flowcharts showing this process. Both figures are linked together at (A) to form a complete flowchart.

The process shown in FIGS. 8A and 8B takes the following steps.

The calculation process starts at step 0800.

(1) As in the above process shown in FIG. 4, a table is prepared to store the values of expressions each assigned to a respective one of the variables A[0], A[1], A[2], and A[3], at step 0801.

(2) Then, initialization is carried out by letting S1=1 and S2=1. The variables S1 and S2 are each provided to hold a value obtained as a result of calculation using a respective one of two divided secret exponents (that is, divided secret information). (step 0823)

(3) A random number R for scrambling is prepared. In this case, a pseudorandom number may be used as the random number R. (0802)

(4) An exponent x is divided into two divided exponents at step 0803 as follows.

t[0]=V t[1]=x−V (5) The two divided secret keys (exponents) t[0] and t[1] are each used to perform respective modular exponentiations. The process of these modular exponentiations is the same as that of the ordinary one as illustrated below.

To begin with, the fourth-power operations S1=S1^4 mod n and S2=S2^4 mod n are performed for t[0] and t[1] respectively at steps 804 and 805.

(6) It is determined which decision step corresponds to each bit block obtained as a result of further dividing the above divided secret keys t[0] and t[1] for every two bits, starting from the bit block of the most significant two bits of one of the divided secret keys, and sequentially checking one bit block after another. The above determination is made based on the value of each bit block, that is, whether the value of each bit block is "00", "01", "10", or "11". (steps 0806, 0807, 0808, 0809, 0810, 0811, 0812, and 0813)

(7) The following modular multiplications are performed using the above S1 and S2, and the values stored in the table prepared at step 0801. (steps 0814, 0815, 0816, 0817, 0818, 0819, 0820, and 0821)

S1=S1*A[j] mod n, where j=0,1,2,3.

S2=S2*A[j] mod n, where j=0,1,2,3.

(8) If all the bit blocks have been checked, the final values of S1 and S2 are obtained. (steps 0824 and 0825)

(9) Lastly, the operations S1*S2 mod n is performed.

Since t[0]+t[1]=x, the equation S1*S2 mod n=y^x mod n holds. The right side of the equation is the original encryption formula for data to be transmitted. (step 0826)

To successfully perform statistical processing of consumed-current waveforms, each bit value of the secret key must remain the same how many times the corresponding process is performed. The simplest example of the statistical processing is averaging of waveforms to remove noise components from them. This method of removing noise is widely used. Actually, many digital oscilloscopes have a function to average waveforms. In the ordinary process shown in FIG. 4, whenever same data is input, same current value is output except for its noise components. This means that the noise components can be removed by gathering many current waveforms of the same input data and averaging them.

On the other hand, consider a case in which an attacker observing the currents knows the fact that the process of scrambling the currents shown in FIGS. 8A and 8B has been already carried out. The attacker can derive the proper key by obtaining t[0] and t[1] to calculate S1 and S2, and adding them at the final step.

However, it is generally difficult to remove current noise by hardware alone. That is, it is difficult to fully specify the keys t[0] and t[1] by observing only a single current waveform. Therefore, it is necessary to obtain a plurality of waveforms in order to enhance the accuracy. However, in the process shown in FIGS. 8A and 8B, the random number R changes every time the current is measured, thereby changing the values of t[0] and t[1]. As a result, obtaining many waveforms to average them only produces a confused result since the obtained waveforms each correspond to a different exponent, making it difficult to extract any meaningful information from them.

Description will be made of another method (a fourth method) for scrambling the currents by dividing the secret key (secret exponent). This method uses the Euler's totient function f(n)=(p-1)(q-1).

According to Euler theorem, if y and n are natural numbers prime to each other, the equation y^f(n) mod n=1 holds. From this equation, the equation y^x mod n=y^(x+Sf(N)) mod n also holds.

Figure 9:
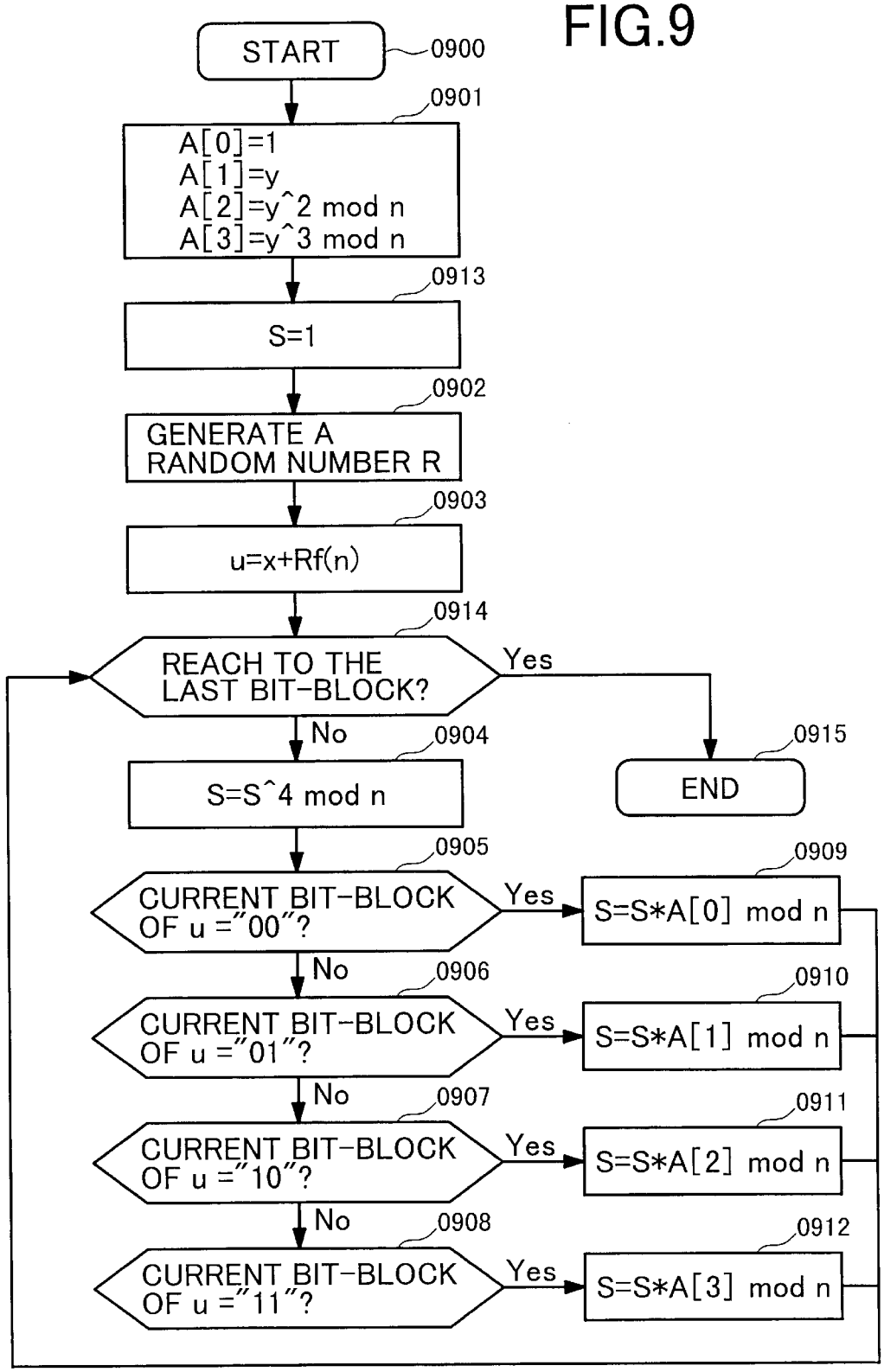
FIG. 9 is a flowchart showing a method for scrambling currents in an IC card by using exponents having different bit patterns.

FIG. 9 is a flowchart showing a process of scrambling the currents using the above equation. This process has substantially the same structure as that of the process employing the ordinary modular exponentiation shown in FIG. 4.

(1) A table 0901 is prepared to store the values of expressions each assigned to a respective one of the variables A[0], A[1], A[2], and A[3]. This table 0901 is the same as that in FIG. 5. (step 0901)

(2) Variables for storing operation results are initialized at step 0904.

(3) A random number R for scrambling is generated. In this case, a pseudorandom number may be used as the random number R. (0902)

(4) The exponent x is replaced by u(=x+Rf(n)) at step 0903.

The subsequent process steps are the same as those for the ordinary modular exponentiation.

(5) The bit values of the above exponent u are read for every two bits (a bit block) starting from the first two bits. Then, the fourth-power operation S=S^4 mod n is performed. (step 0904)

(6) It is determined which decision step corresponds to each bit block of u. The above determination is made based on the value of each bit block, that is, whether the value of each bit block is "00", "01", "10", or "11". (steps 0905, 0906, 0907, and 0908)

(7) The following modular multiplications are performed which each correspond to a respective decision step (condition). (steps 0909, 0910, 0911, and 0912) S=S*A[j] mod n, where j=0,1,2,3, and A[0]=1, A[1]=y, A[2]=y^2 mod n, and A[3]=y^3 mod n.

(8) The above operations are repeated until all the bits of the exponent have been checked. (steps 0914 and 0915)

For example, when N=187 (=11*17), f(N)=(11-1)*(17-1)=160. Accordingly, if the exponent x=38=100110 (binary expression), x+f(N)=38+160=198=11000110 (binary expression) and x+2f(N)=38+320=358=101100110 (binary expression).

Thus, two different bit patterns are produced. Since the exponent u has a bit pattern different from that of the exponent x, the exponent u proceeds to a different operation step from that for the exponent x, scrambling the corresponding current.

However, even though "x+Sf(N)" has a bit pattern different from that of x, they are of the same residue class modulo N. Accordingly, deriving the bit pattern of "x+Sf(N)" from a single current measurement is equivalent to deriving that of x (or stealing the secret key x, so to speak). On the other hand, since an observed current inevitably includes current noise, it is often necessary to average its waveforms. However, as the example shown in FIG. 9, if the value of S is changed for each modular exponentiation (especially randomly), obtaining many waveforms to average them only produces a confused result since the obtained waveforms each correspond to a different exponent, making it difficult to extract any meaningful information from them. It should be noted that the value of S may be randomly changed using pseudorandom numbers.

Next, consider an application of the concept described above to elliptic-curve encryption.

First of all, the elliptic-curve encryption itself is explained briefly.

An elliptic curve is a set of zero points of a tertiary polynomial. To put it concretely, for a characteristic K of other than 2, the elliptic curve is expressed in the following standard form:

$$y^2 = x^3 + Ax^2 + Bx + C$$

On a field with a characteristic of 2, on the other hand, the elliptic curve is expressed in the following standard form:

$y^2+cy=x^3+Ax+B$ or $y^2+xy=x^3+Ax+B$

In either case, consideration includes an infinite point O to be described later.

Figure 10:
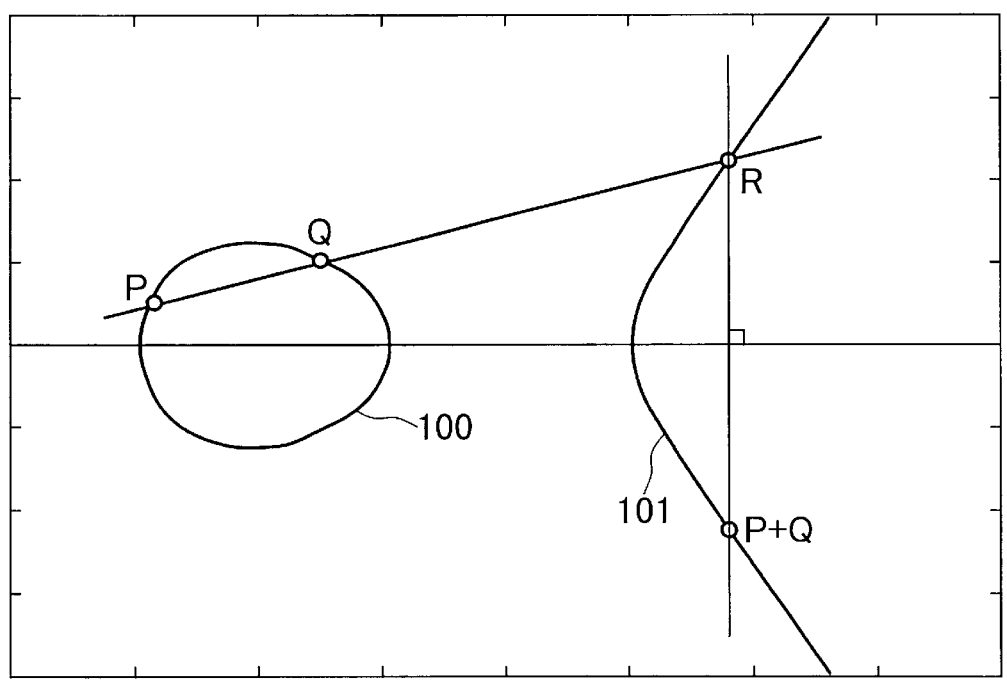
FIG. 10 is a diagram used to illustrate addition on an elliptic curve.

FIG. 10 is a diagram showing typical shapes of the elliptic curve. Units taken on the X horizontal axis and the Y horizontal axis are arbitrary. To be more specific, curves 100 and 101 are each a typical elliptic curve. In the present invention, the value of the characteristic, that is, whether or not the characteristic is 2, is not of particular importance. Thus, for the sake of brevity, a characteristic of other than 2 is assumed in the following description. In addition, since what is required for encryption is only the case of a finite field, only the case of a finite field is explained. A field composed of a finite number of elements is referred to as a finite field or a Galois field. The structure of a finite field is well known. A most simple technique to configure a finite field is explained as follows.

First of all, consider a residue class ring Zp of an integer ring with an element count p used as modulo. In the residue class ring Zp, since each element other than 0 has a reciprocal, the field has a structure. This field is called a prime field denoted by a symbol Fp. The prime field is an example of the most primitive finite field.

Next, consider a polynomial f (X) having elements Fp as its coefficients. By attaching zero points not included in Fp to Fp, a new field can be configured. The newly configured field is called a finite-order algebraic extension field of Fp. As is commonly known, the number of elements pertaining to the finite-order algebraic extension field of Fp is a number of the pth power. A finite-order algebraic extension field may be denoted by a symbol Fq or the like indicating that the number of elements is equal to q.

It is possible to define an operation to be carried out on points on an elliptic curve. As an example, the concept of an addition operation carried out on points on an elliptic curve is explained by referring to FIG. 10. Consider two points P and Q on the elliptic curve 100. A straight line is drawn through the two points P and Q. The straight line crosses the elliptic curve 101 at a point S. Another point symmetrical to the point S with respect to the x axis exists on the elliptic curve 101 due to a property of symmetry of the curve 101. This other point is denoted by a notation (P+Q) which defines the sum of P and Q. It should be noted that for the point P coinciding with the point Q (or P=Q), the straight line passing through the two points is a line tangential to the elliptic curve 101 at these coinciding points. If there is no cross point, an infinite point is taken into consideration as a virtual point. This imaginary point is regarded as a cross point. The infinite point is denoted by the symbol 0. Another point symmetrical to the point P with respect to the x axis exists on the elliptic curve 100. This other point is referred to as the reciprocal of the point P and denoted by a symbol –P. A value obtained as a result of adding the point P in G (E/Fq) to be described later to itself k times is referred to as kP. On the other hand, a value obtained as a result of adding the point –P to itself k times is referred to as –kP. The operation of adding the point P to itself k times is referred to as scalar multiplication of the point P. Their coordinates can be represented by a rational expression of P and Q coordinates. Thus, it is possible to define an addition operation on a general field. Much like the ordinary addition, the associative law and the communicative law are applicable to the addition operation described above. In the addition operation, the infinite point O plays the role of the value of zero in the same way as the ordinary addition. The sum of –P and P is 0. This indicates that the addition operation carried out on points on an elliptic curve has the structure of an Abelian group. This is referred to as a Mordell-Weil group in some cases. A Mordell-Weil group with a fixed elliptic curve E and a fixed definition field Fq is denoted by the symbol G (E/Fq) in some cases. The structure of G (E/Fq) is very simple. As is commonly known, the structure has the same form as a cyclic group or a product of two cyclic groups.

In general, even if the value of a product Q=kP is known, the amount of processing to reversely compute the value of k is large and thus the processing is not simple. This large amount of reverse computation and the complicated processing are known as a discrete logarithm problem. The elliptic-curve encryption utilizes the fact that the discrete logarithm problem on an elliptic curve is difficult.

The following description explains an encryption method utilizing an elliptic curve provided by the present invention. There are a variety of encryption methods each utilizing an elliptic curve. Such encryption methods include an elliptic curve ElGamal cryptosystem and an elliptic ESA (Electric Signature Algorithm). The elliptic curve ElGamal cryptosystem is explained below. In the case of the elliptic curve ElGamal cryptosystem, it is possible to apply the encryption technique using the scalar multiplication of a point on an elliptic curve in the same way.

Assume that an elliptic curve E and a point P on the curve are disclosed. In general, the point P has is a point with a large order. This point is called a base point.

Consider a case in which Mr. A sends secret information M to Mr. B. The secret information M is expressed by a point on the elliptic curve. It should be noted that, for how to embed plaintext (ciphertext) into an elliptic curve, refer to "A Course in Number Theory and Cryptography" authored by N. Koblitz, second edition, Graduate Texts in Mathematics 114, Spring-Verlag, 1987. <Step 1>Mr. B, the message recipient, selects a positive integer x[B], keeps the integer as a secret key and catalogs Y[B]=x[B]P in a public-key note. <Step 2>Mr. A, the message sender, sends C1=RP and C2=M+RY[B] where R is a random number to Mr. B. <Step 3>Mr. B receives C1 and C2, decrypting C1 and C2 into M (=C2–x[B]Cl) where x[B] is Mr. B's own secret key.

The need for scalar multiplication of a point on an elliptic curve is not limited to the elliptic curve ElGamal encryption but also for the elliptic-curve encryption.

Figure 11:
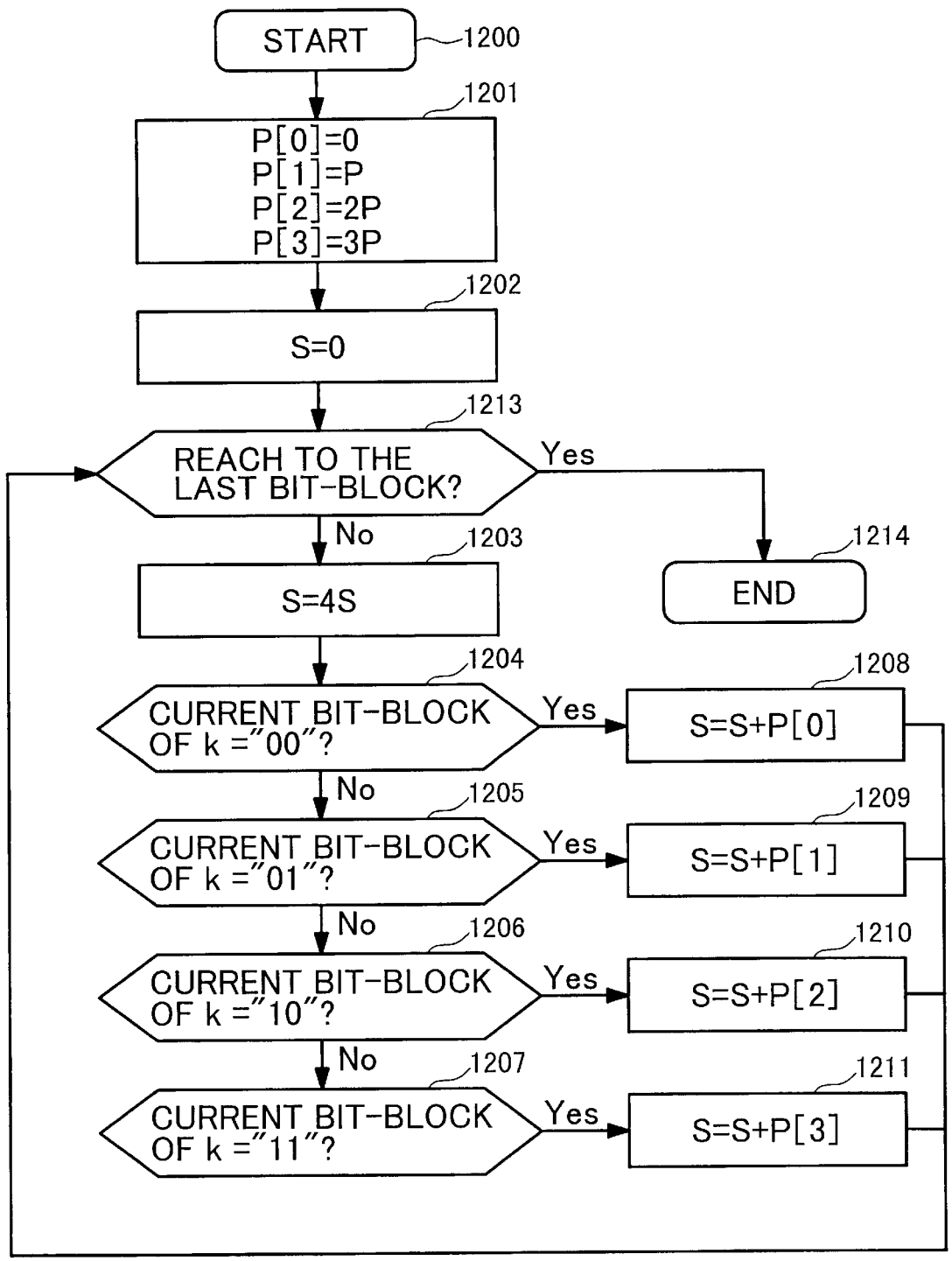
FIG. 11 is a flowchart showing a process of calculating a scalar multiple of a point P on an elliptic curve.

An algorithm of the scalar multiplication is similar to an algorithm of the modular exponentiation. FIG. 11 is a typical flowchart representing processing to apply a standard algorithm for computing a scalar multiple kP of P for every two bits of a secret key in the same way as the modular exponentiation (k is an integer).

(1) The processing is started at step 1200. First of all, a table of base points P is created in order to carry out processing of two bits at one time. In the modular exponentiation, four points O, P, 2P and 3P are prepared for respectively the $0^{th}$ power, the first power, the second power and the fourth power modulo n. To put it concretely, P[0]=0, P[1]=P, P[2]=2P and P[3]=3P at step 1201.

Unlike the modular exponentiation, it is not necessary update this table from time to time. That is to say, the table can be prepared in advance once for all.

(2) At step 1202, the value of a point for computation is initialized.

(3) At step 1203, a four-time value of the value of the point is computed. S=4S.

(4) At step 1204, 1205, 1206 or 1207, two bits of the secret key k are examined to form a judgment as to whether or not the examined two bits are 00, 01, 10 or 11 respectively. The secret key k is stored in advance typically in an EEPROM of an IC chip.

(5) If the two bits are 00, 01, 10 or 11, specific processing is carried out to add P[0], P[1], P[2] or P[3] to S at step 1208, 1209, 1210 or 1211 respectively. That is, S=S+P[j] where j=0, 1, 2 or 3 if the two bits are 00, 01, 10 or 11 respectively.

(6) This processing to compute the scalar multiple kP is carried out repeatedly till all bits of the secret key k are examined as indicated by a result of a judgment formed at a step 1213. At a step 1214, this processing is ended.

This processing is carried out for every two bits of the secret key k starting with the two most significant bits. It is obvious that the structure of the algorithm is mathematically similar to the modular exponentiation. As will be described again later, the modular exponentiation in the RSA and the addition operation on an elliptic curve can each be regarded as an operation in an algebraic system called Zn or G (E/Fq) respectively. These operations can be extended to a more general algebraic system. A method adopted in computer processing with the extension to a more general algebraic system is executed by using the algorithm described above.

In execution of an internal program by using a microcomputer, on the other hand, it is quite within the bounds of possibility that the amount of power consumed internally leaks out during an operation. Thus, there is a risk of leaking of secret-key processing in the execution of the process by a microcomputer. For example, specific processing is carried out in dependence on the value of bits in the secret key k. If a difference in specific processing appears as a difference in power consumption, it is quite within the bounds of possibility that the value of bits of the secret key k can be recognized from a power waveform. In the example described above, the value of every two bits in the secret value is examined.

The encryption and decryption operations of the elliptic-curve encryption described above are executed in accordance with a procedure represented by the flowchart shown in FIG. 11.

When a secret key k is read out in statistical processing, the processing is split at random by keeping in mind that the value of bits in the secret value should always remain the same.

Figure 12A:
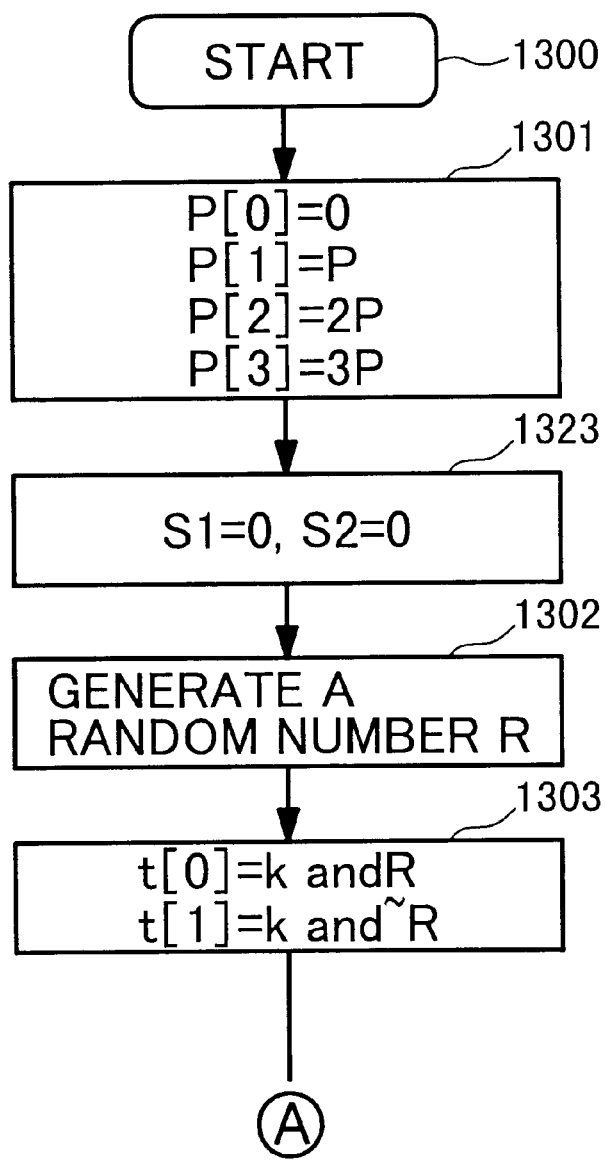
FIG. 12A is a flowchart showing the first part of a process of calculating a scalar multiple of a point on an elliptic curve, wherein a given scalar is divided and used for the calculation.
Figure 12B:
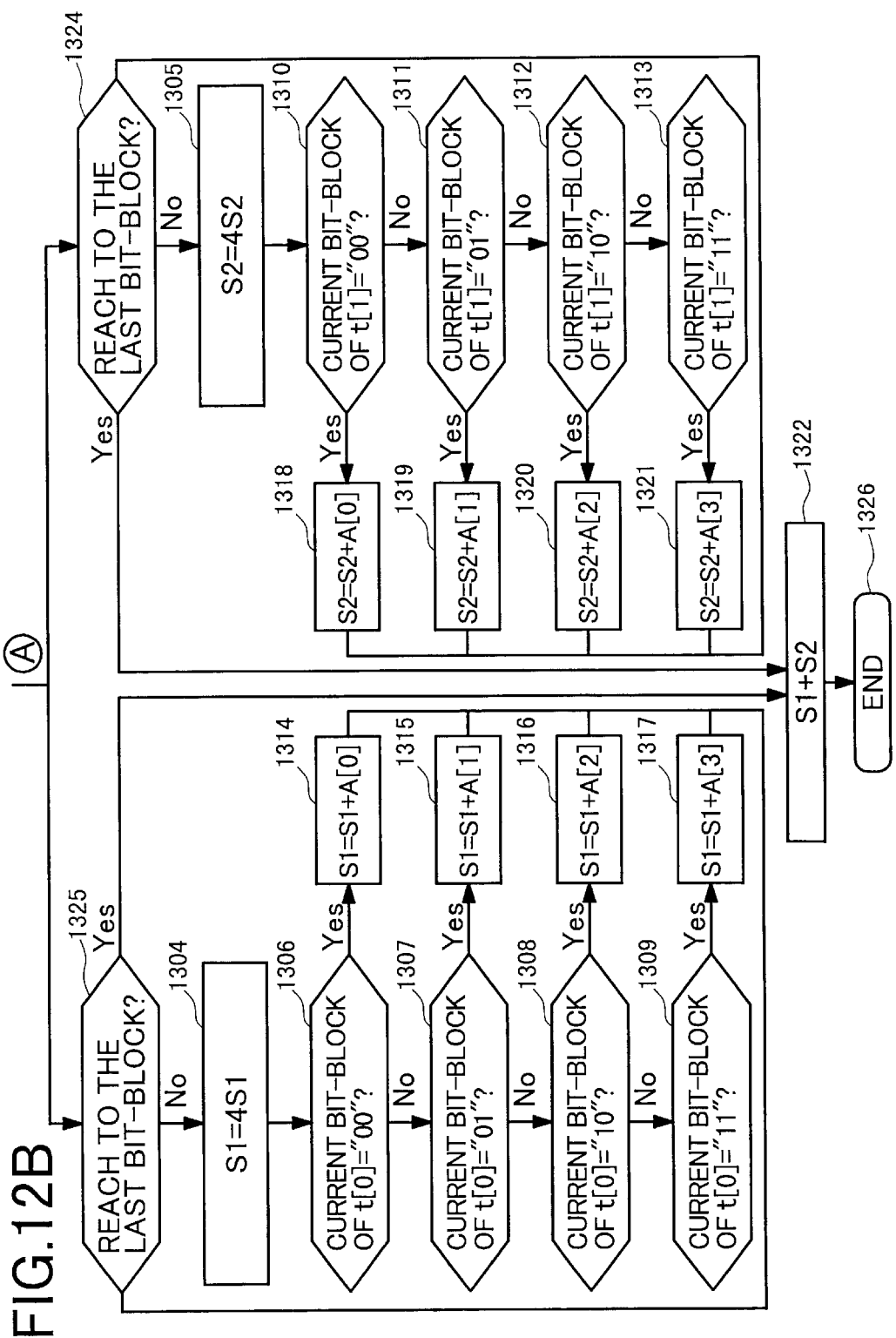
FIG. 12B is a flowchart showing the second part of the above process of calculating a scalar multiple of a point on an elliptic curve, wherein a given scalar is divided and used for the calculation.

That is to say, this method is a technique of splitting of a scalar in computation to calculate a scalar multiple. It should be noted that, in this case, the random splitting may include randomness based on a pseudo random number. A flowchart representing this processing is shown in FIGS. 12A and 12B. Both figures are linked together at (A) to form a complete flowchart.

(1) At steps 1300 and 1301 of the flowchart of FIGS. 12A and 12B representing typical processing, a table of base points P is created in order to carry out processing of every two bits of the secret key k. The processing shown in FIG. 12 is similar to that shown in FIG. 11.

(2) At the next step 1323, the values of points for computation are initialized. That is, S1=0 and S2=0.

(3) At the next step 1302, a random number R for scrambling is generated.

(4) At the next step 1303, by using the random number R for scrambling, the secrete key k is divided into two as follows.

t[0]=k and R t[1]=k and ~R, where ~R is the bit inverse of R.

The two divided secret keys t[0] and t[1] are each used to perform respective modular exponentiations. The process of these modular exponentiations is the same as that of the ordinary one as illustrated below.

(5) To begin with, the 4-time operations S1=4S1 and S2=4S2 are performed at steps 1304 and 1305.

(6) It is determined which decision step corresponds to each bit block obtained as a result of further dividing the above divided secret keys t[0] and t[1] for every two bits, starting from the bit block of the most significant two bits of one of the divided secret keys, and sequentially checking one bit block after another. The above determination is made based on the value of each bit block, that is, whether the value of each bit block is "00", "01", "10", or "11". (steps 1306, 1307, 1308, 1309, 1310, 1311, 1312, and 1313)

(7) The following modular multiplications are performed using the above S1 and S2, and the values stored in the table prepared at step 1301. (steps 1314, 1315, 1316, 1317, 1318, 1319, 1320, and 1321)

S1=S1+A[j], where j=0,1,2,3.

S2=S2+A[j], where j=0,1,2,3.

(8) If all the bit blocks have been checked, the final values of S1 and S2 are obtained. (steps 1325 and 1324)

(9) Lastly, the flow of processing goes on to step 1322 to compute the sum on the elliptic curve (S1+S2) before termination at step 1326. Since t[0]+t[1]=k, S1+S2=kP. Thus, the answer is correct.

In the examples described above, the key information k is divided in units of two bits. The key information may be divided into units of any arbitrary number of bits, such as three bits or four bits for calculation. When k is divided in units of j bits, the calculation is carried out $2^j$ times ($2^j$ times). The processing in j-bit units is an implementation of a concept similar to the modular multiplication described above.

To successfully perform statistical processing of current waveforms, each bit value of the secret key must remain the same how many times the corresponding process is performed. The simplest example of the statistical processing is averaging of waveforms to remove noise components from them. This method of removing noise is widely used. Actually, many digital oscilloscopes have a function to average waveforms. In the ordinary encryption process shown in FIG. 11, whenever same data is input, same current value is output except for its noise components. This means that the noise components can be removed by gathering many current waveforms of the same input data and averaging them.

On the other hand, consider a case in which an attacker observing the currents knows the fact that the process of scrambling the currents shown in FIGS. 12A and 12B has already been carried out. The attacker can derive the proper key by obtaining t[0] and t[1] to calculate S1 and S2, and adding them at the final step. However, it is generally difficult to remove current noise by hardware alone, that is, it is difficult to fully specify the keys t[0] and t[1] by observing only a single current waveform. Therefore, it is necessary to obtain a plurality of waveforms in order to enhance the accuracy. However, in the process shown in FIGS. 12A and 12B, the random number R changes every time the current is measured, thereby changing the values of t[0] and t[1]. As a result, obtaining many waveforms to average them only produces a confused result since the obtained waveforms each correspond to a different exponent, making it difficult to extract any meaningful information from them.

Figure 13A:
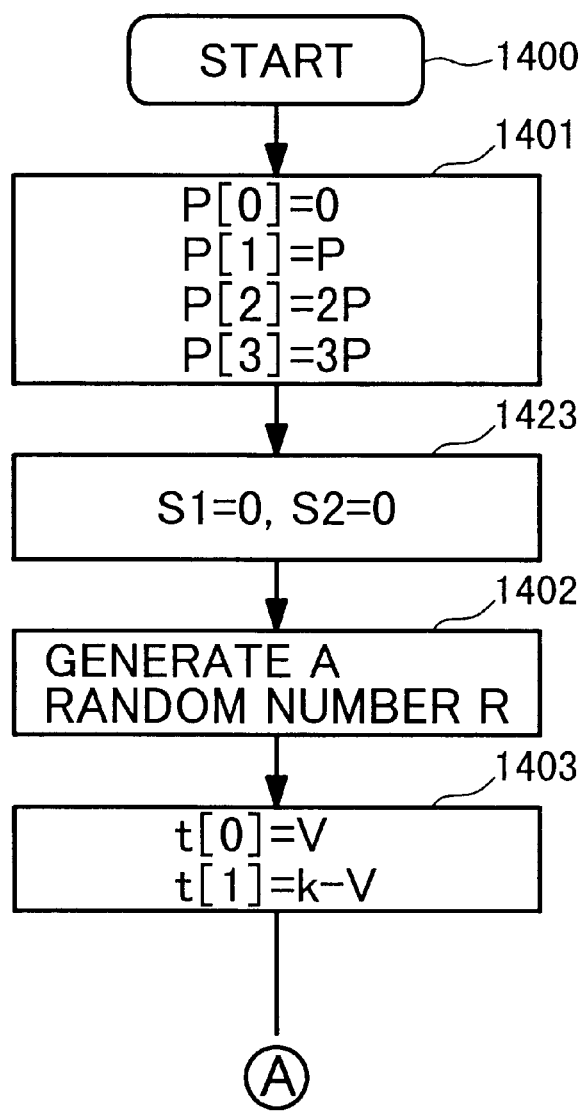
FIG. 13A is a flowchart showing the first part of another process of calculating a scalar multiple of a point on an elliptic curve, wherein a given scalar is divided and used for the calculation.
Figure 13B:
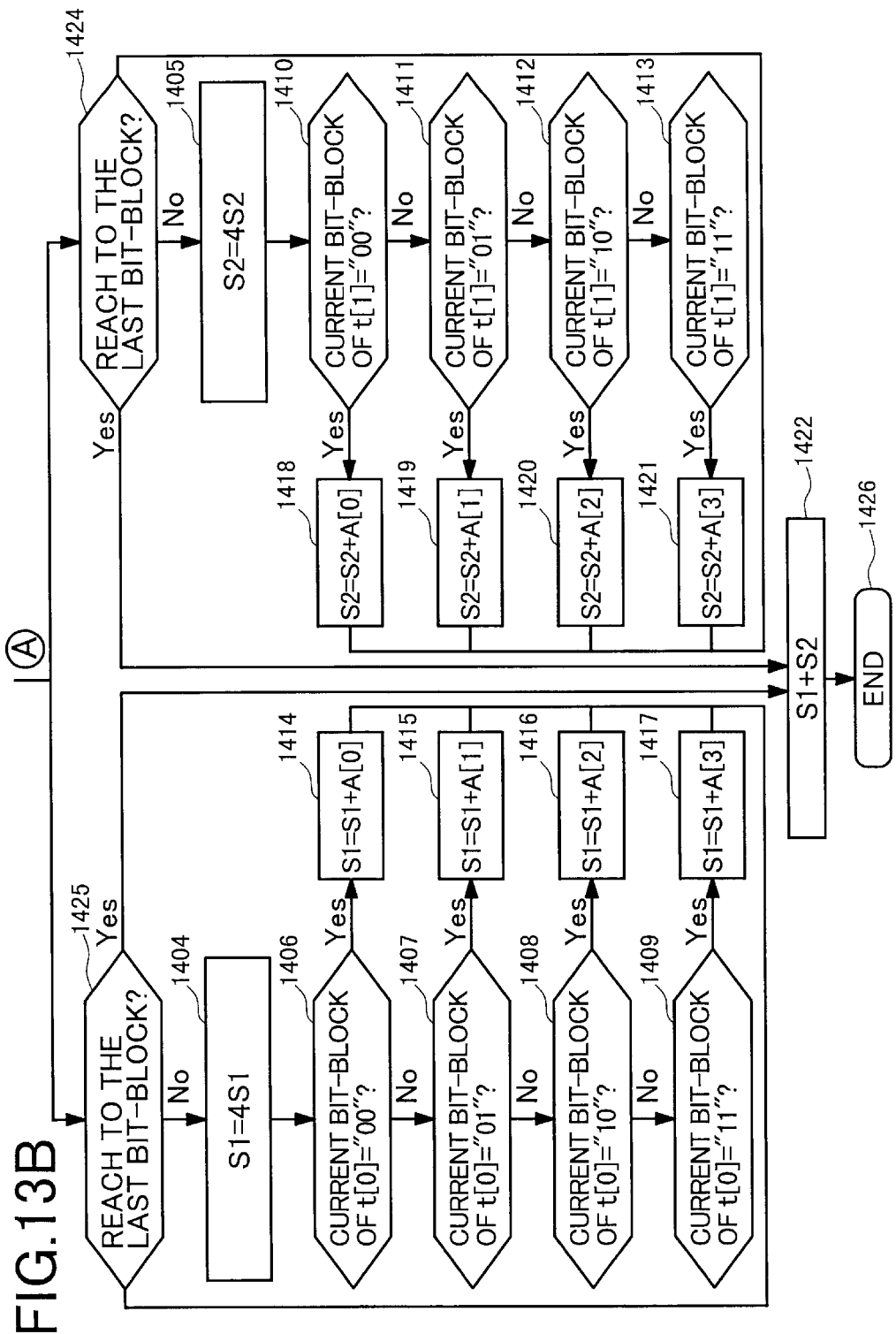
FIG. 13B is a flowchart showing the second part of the above another process of calculating a scalar multiple of a point on an elliptic curve, wherein a given scalar is divided and used for the calculation.

The elliptic curve cryptography can be applied to another method for dividing a secret key which is similar to a method described above using a modular exponentiation in the RSA cryptography. FIGS. 13A and 13B are flowcharts illustrating this method. Both figures are linked together at (A) to form an entire flowchart.

The process shown in FIGS. 13A and 13B proceeds as does the ordinary process shown in FIG. 11.

The processing is started at step 1400.

(1) At step 1401, a table is created in order to carry out processing of every two bits of a secret key k. The table is set to indicate that P[0]=0, P[1]=P, P[2]=2P and P[3]=3P.

(2) Then, variables for storing calculation results are initialized at step 1423.

(3) At step 1402, a random number R for scrambling is prepared. In this case, a pseudorandom number may be used as the above random number R.

(4) At 1403, by using a random number V for scrambling equal to or less than k, the secret key k is divided into two divided secret keys as follows.

t[0]=V
t[1]=k−V (5) The two divided secret keys t[0] and t[1] are each used to perform respective modular exponentiations. The process of these modular exponentiations is the same as that of the ordinary one. To begin with, the 4-time operations S1=4S1 and S2=4S2 are performed at steps 1404 and 1405.

(6) It is determined which decision step corresponds to each bit block obtained as a result of further dividing the above divided secret keys t[0] and t[1] for every two bits, starting from the bit block of the most significant two bits of one of the divided secret keys, and sequentially checking one bit block after another. The above determination is made based on the value of each bit block, that is, whether the value of each bit block is "00", "01", "10", or "11". (steps 1406, 1407, 1408, 1409, 1410, 1411, 1412, and 1413)

(7) The modular multiplication corresponding to the above determined decision step is performed using values stored in the table. (steps 1414, 1415, 1416, 1417, 1418, 1419, 1420, and 1421)

(8) If all the bit blocks have been checked, the final values of S1 and S2 are obtained. (steps 1424 and 1425)

(9) Lastly, the sum of S1+S2 is calculated at steps 1422 and 1426. Since t[0]+t[1]=k, S1+S2=kP. Thus, the answer is correct. (step 1420)

To successfully perform statistical processing of current waveforms, each bit value of the secret key must remain the same. how many times the corresponding process is performed. The simplest example of the statistical processing is averaging of waveforms to remove noise components from them. This method of removing noise is widely used. Actually, many digital oscilloscopes have a function to average waveforms. In the ordinary encryption process shown in FIG. 11, whenever same data is input, same current value is output except for its noise components. This means that the noise components can be removed by gathering many current waveforms of the same input data and averaging them.

On the other hand, consider a case in which an attacker observing the currents knows the fact that the process of scrambling the currents shown in FIGS. 13A and 13B has already been carried out. The attacker can derive the proper key by obtaining t[0] and t[1] to calculate S1 and S2, and adding S1 and S2 at the final step. However, it is generally difficult to completely remove current noise by hardware alone, that is, it is difficult to fully specify the keys t[0] and t[1] by observing only a single current waveform. Therefore, it is necessary to obtain a plurality of waveforms in order to enhance the accuracy.

However, in the process shown in FIGS. 13A and 13B, the random number R changes every time the current waveform is measured, thereby changing the values of t[0] and t[1]. As a result, obtaining many waveforms to average them only produces a confused result since the obtained waveforms each correspond to a different bit pattern, making it difficult to extract any meaningful information from them.

Next, description will be made of a method for scrambling the currents similar to a method using an elliptic curve described above.

In G (E/Fq), there exist positive integers (each denoted by m) which satisfy the equation mP=0, where P denotes all the elements (which correspond to points on an elliptic curve). The smallest m is referred to as the order of P and expressed as ord(P).

By definition, the equation ord(P)=0 holds. Accordingly, the equation (k+S*ord(P))P=kP also holds for any integer S. This equation for an elliptic curve corresponds to the equation y^(x+Sf(n)) mod n=y^x mod n in the modular exponentiation.

Figure 14:
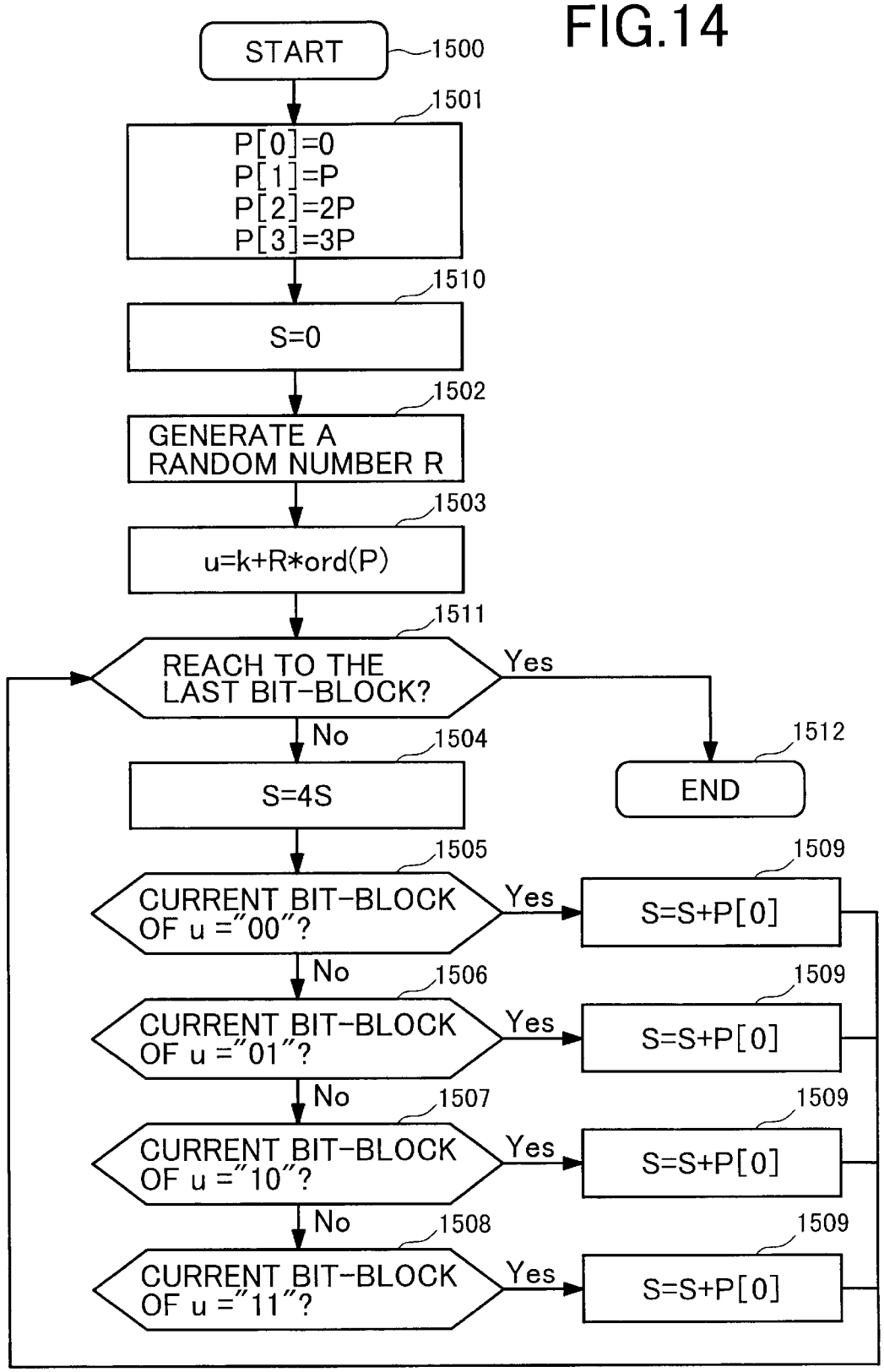
FIG. 14 is a flowchart showing a method for scrambling currents in an IC card by using scalars having different bit patterns.

By using this property, a key k+S*ord(P) having a bittern different from that of k can be obtained. FIG. 14 shows an algorithm for scrambling statistical processing of currents for analysis, using the above property.

The processing is started at step 1500.

(1) At step 1501, a table is created in order to carry out processing of every two bits of an input value. The table is set to indicate that P[0]=0, P[1]=P, P[2]=2P and P[3]=3P.

(2) Then, the variable S for storing a calculation result is initialized so that S=0 at step 1510.

(3) At step 1502, a random number R for scrambling is generated. In this case, a pseudorandom number may be used as the above random number R.

Next, the scalar to be processed is changed from k to u(=k+R*ord(P)) at step 1503.

As illustrated below, the subsequent steps are the same as those for the ordinary modular exponentiation.

(4) The bit pattern of u is read in units of two bits starting from the most significant two bits. After that, the 4-time operation S=4S is performed at step 1504.

(5) At step 1505, 1506, 1507, or 1508, the value of the read two bits of u is examined to form a judgment as to whether or not the value is "00", "01", "10", or "11" respectively.

(6) Depending on the examined value, one of predetermined addition operations is performed on an elliptic curve. Specifically, addition of S and one of P[0](=0 an infinite point), P[1](=P), P[2](=2P), and P[3](=3P) is performed on an elliptic curve. (step 1509)

(7) The above process is repeated until all bits of the scalar k are examined. After all the bits of the scalar k are examined, this processing is ended. (steps 1511 and 1512)

As in the modular exponentiation, k and "k+R*ord(P)" have bit patterns different from each other. Accordingly, they each proceed to a different operation step, thereby scrambling the corresponding waveform.

As described above, however, even though "k+S*ord(P)" has a bit pattern different from that of k, it is equivalent to k on an elliptic curve E. Accordingly, deriving the bit pattern of "k+S*ord(P)" from a single current measurement is equivalent to deriving that of k (or stealing the secret key k, so to speak). On the other hand, since an observed current inevitably includes current noise, it is often necessary to average the waveforms. However, as in the example shown in FIG. 14, if the value of S is changed (especially randomly) for each scalar multiplication operation on a point on an elliptic curve, obtaining many waveforms to average them only produces a confused result since the obtained waveforms each correspond to a different exponent, making it difficult to extract any meaningful information from them. It should be noted that the value of S may be randomly changed based on pseudorandom numbers.

The following method enhances the current scrambling effect provided by the processes described above. Specifically, after an input signal or an exponent is divided, the order of the calculation steps is changed in the subsequent operation. This technique can be applied to the preferred embodiments of the present invention described above.

Figure 15A:
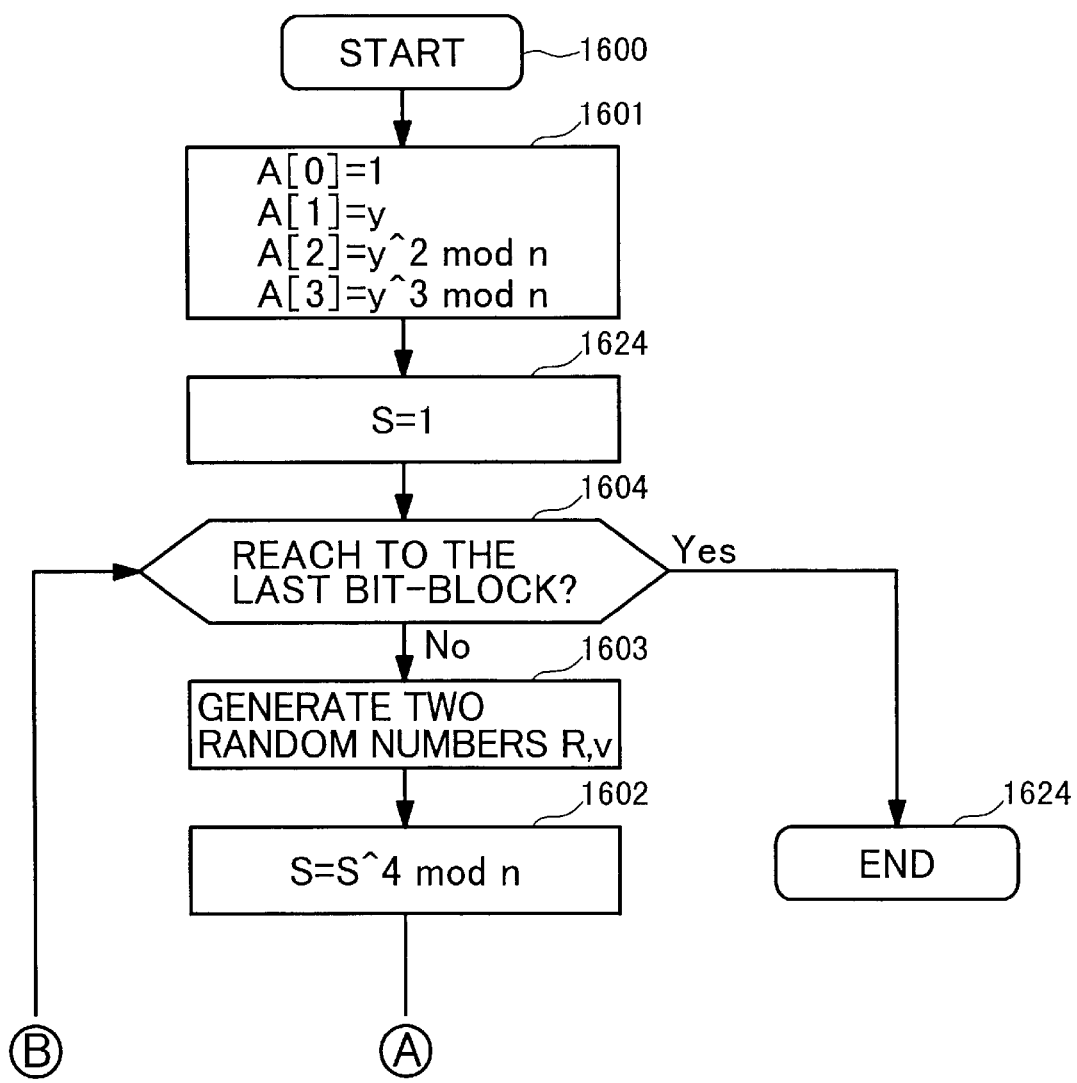
FIG. 15A is a flowchart showing the first part of a process of randomly determining the order of process steps after input data is divided.

FIGS. 15A and 15B show a method for changing the order of calculation steps for each iteration after input data is divided in the modular exponentiation y^x mod n. Both figures are actually joined together at points (A) and (B) in the figures to form an entire flowchart. This example can be regarded as a further transformation calculation of the above example in FIG. 5.

The processing is started at step 1600.

(1) At step 1601, a table is created in order to carry out processing of two bits at one time. The table is set to indicate that A[0]=1, A[1]=y, A[2]=y^2 mod n, and A[3]=y^3 mod n.

(2) A variable S for storing a calculation result is initialized so that S=1 at step 1624.

(3) A random number R for scrambling input data and a random number v (0 or 1) for randomly determining which branch to follow are generated. In this case, pseudorandom numbers may be used to provide the above random number R and random number v for branching. (step 1603)

(4) It is determined whether the last two bits of x have been checked at step 1604. Then, it is determined whether the value of each bit block (two bits) of x is "00", "01", "10", or "11" at step 1605, 1606, 1607, or 1608. Based on the above determination, it is determined whether A[0], A[1], A[2], or A[3] is to be divided.

(5) Furthermore, depending on whether the value of v is 1, it is determined whether or not to reverse the order of the subsequent restoration steps, at step 1609, 1610, 1611, or 1612.

(6) Based on the above determinations as to the value of the bit block and the value of v, the following restoration operations are performed. (steps 1613, 1614, 1615, 1616, 1617, 1618, 1619, and 1620)

B[0]=A[j] AND R and B[1]=A[j] AND ~R, where j=0,1, 2,3.

(7) The final operation result S is obtained after the following three operations.

S=S*B[0] mod n (step 1621)

S=S*B[1] mod n (step 1622)

S=S1+S2 mod n (step 1623) (which is an addition operation on the above two operation results)

(8) After making sure that the last two bits of x have been checked at step 1604, the calculation is ended at step 1624.

This process further adds information necessary to infer the internal processing contents from the consumed currents observed. As a result, the inference becomes more difficult.

Figure 16A:
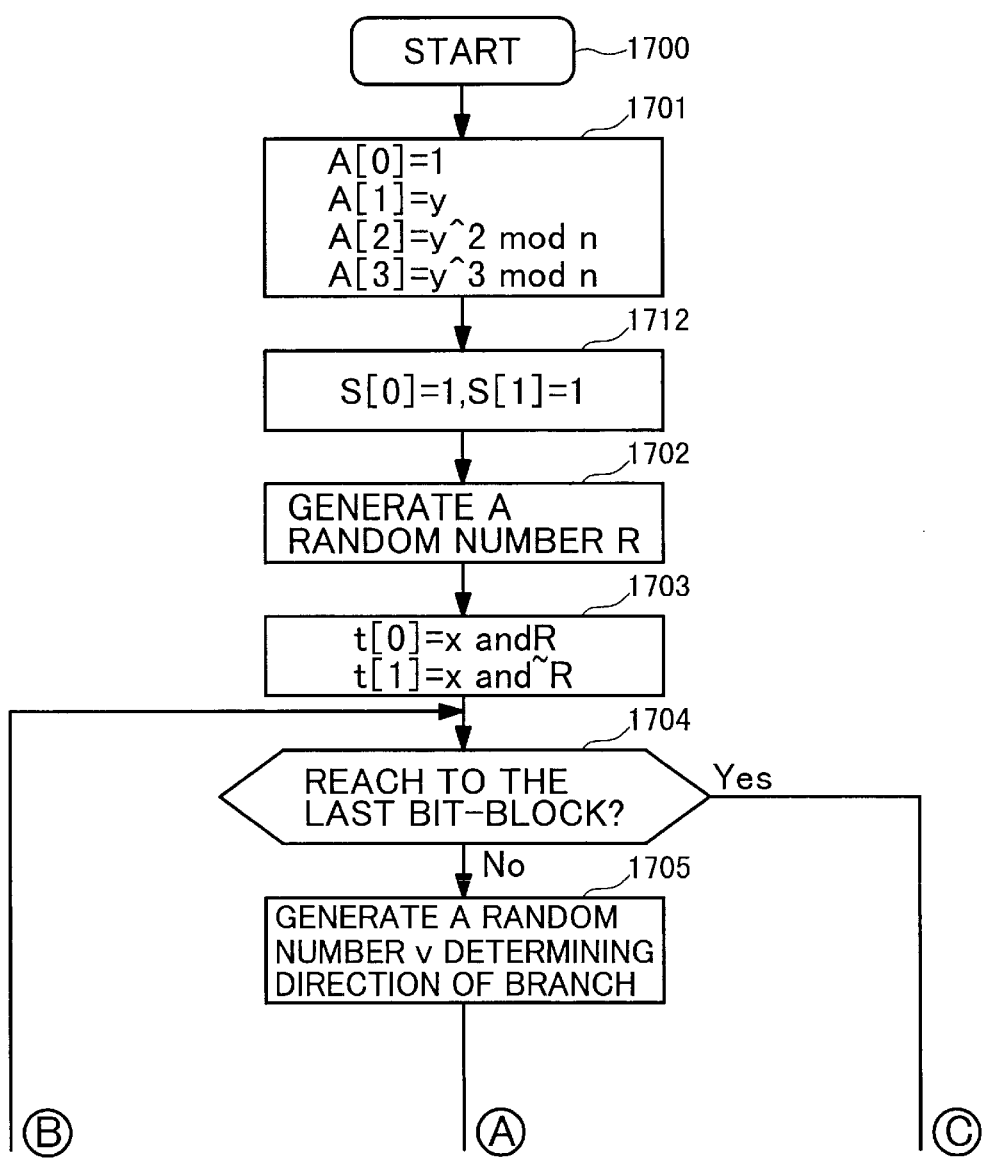
FIG. 16A is a flowchart showing the first part of a process of randomly determining the order of process steps after a given exponent is divided.

Also in the case of division of an exponent, the current scrambling effect can be enhanced by randomly determining the order of process steps after the division. FIGS. 16A and 16B show an example of this method. Both figures are actually joined together at points (A), (B), and (C) in the figures to form an entire flowchart. There are a variety of methods for changing the order of process steps. Some of them are illustrated below.

The following calculations are performed in the process shown in FIGS. 16A and 16B. This example can be regarded as a further transformation calculation of the above example in FIGS. 7A and 7B.

(1) The processing is started at step 1700. At step 1701, a table is created in order to carry out processing of two bits at one time.

(2) The variables S[0] and S[1] are initialized so that S[0]=1 and S[1]=1 at step 1712. The details of the above two steps were already explained.

(3) At step 1702, a random number R for scrambling is generated to divide an exponent x. A pseudorandom number may be used as the above random number R.

(4) At step 1703, the exponent x is divided into two divided exponents t[0] and t[1] as follows.

t[0]=x AND R and t[1]=x AND ~R, where ~R is the bit inverse of R.

Alternatively, as illustrated above, the exponent x can be divided by the equation t[1]=x−t[0], where t[0] is a random number equal to or less than x.

(5) It is determined whether all bits of x have been checked at step 1704.

(6) If not all bits of x have been checked, a random number v (0 or 1) for branching is generated at step 1702.

(7) At step 1706, it is determined whether this random number v for branching is 0 or 1.

(8) Based on the value of v, the order of the subsequent process steps are changed at steps 1707 and 1709.

Specifically, if v=0, t[0] is first processed at step 1707, and then t[1] is processed at step 1708. If v=1, on the other hand, t[1] is first processed at step 1709, and then t[0] is processed at step 1710.

(9) In either case, after all bits of t[0] and t[1] are checked, modular multiplication of S[0] and S[1], that is, the operation S[0]*S[1] mod n is performed at step 1711.

(10) This calculation result gives the proper encrypted data at step 1713.

Figure 17:
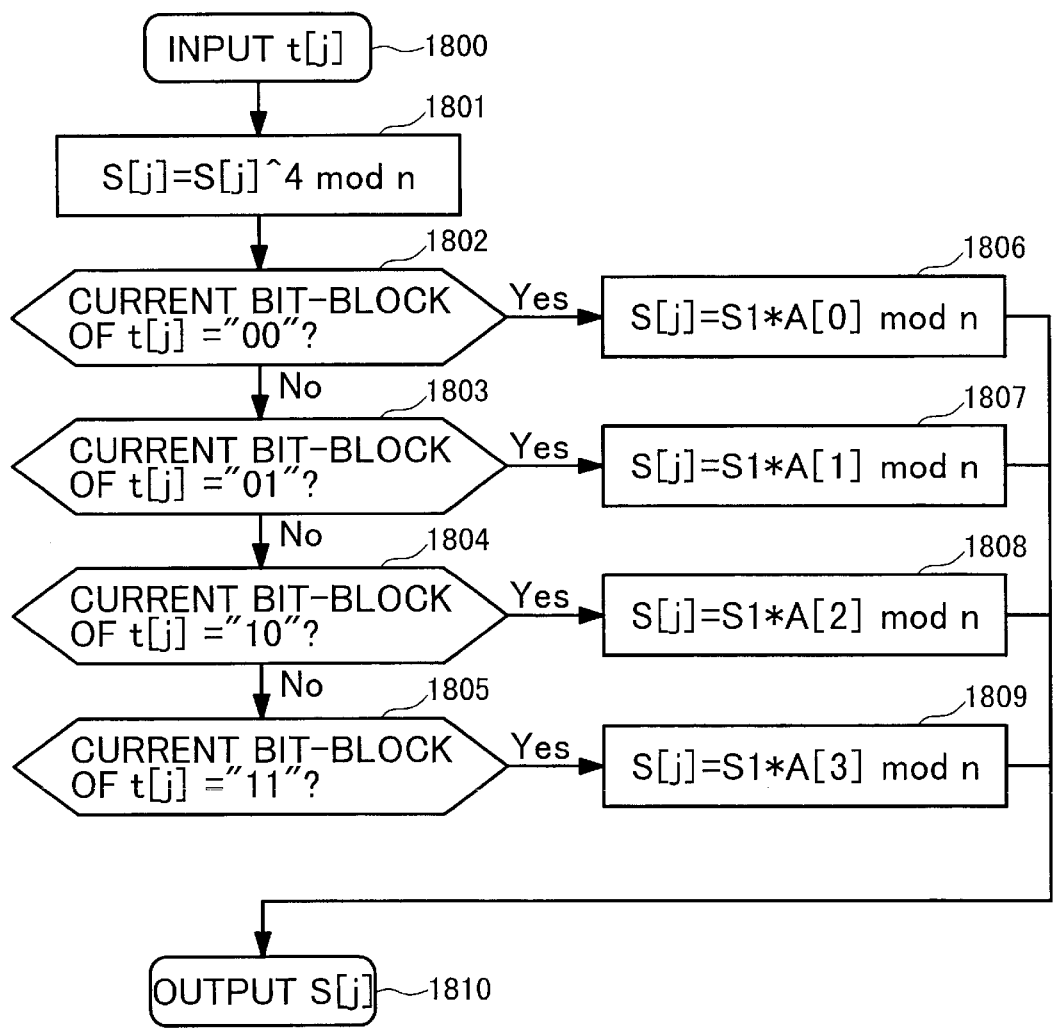
FIG. 17 is a flowchart showing a routine of a modular multiplication for every two bits of input data.

It should be noted that FIG. 17 shows the details of a modular multiplication routine for every two bits of the exponent employed in the process of FIG. 16B.

At step 1800, a signal is input, and the operation S[j]=S[j]^4 mod n is performed.

Each bit block (two bits) of input t(j) is examined. Depending on whether the bit block is "00", "01", "10", or "11", a modular multiplication of S1 and A[0], A[1], A[2], or A[3] is performed respectively. That is, S[j]=S1*A[j] mod n, where j=0,1,2,3. The calculation result S[j] is output. This process makes it impossible to infer the order of the waveform of each consumed current. As a result, it becomes difficult to derive the bit pattern of x from the currents.

Figure 18:
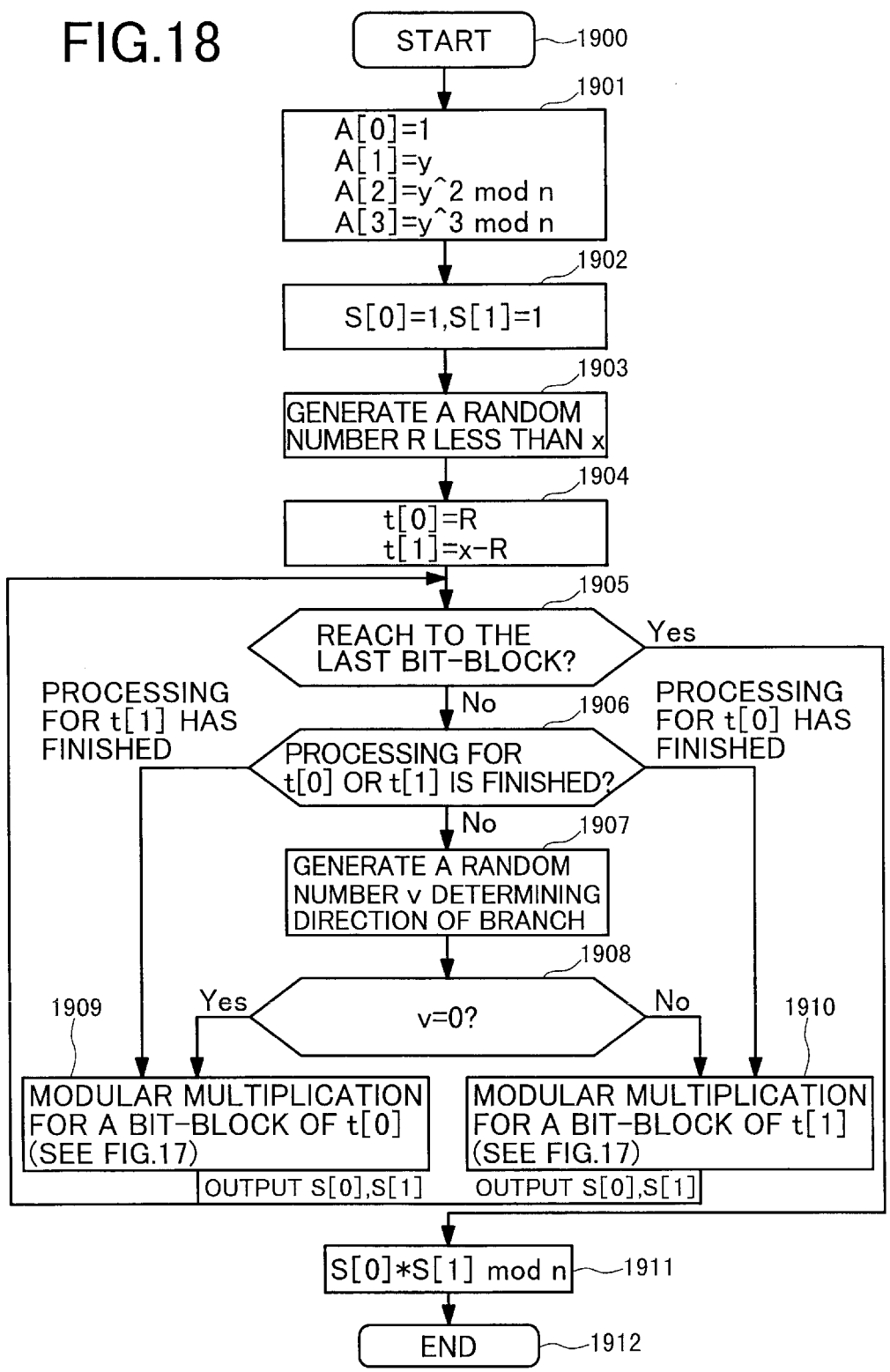
FIG. 18 is a flowchart showing another process of randomly determining the order of operations after a given exponent is divided.

FIG. 18 shows another method for randomly determining the order of exponent processing steps after the exponent is divided. This example is different from that shown in FIGS. 16A and 16B.

The process flow in FIG. 18 proceeds as follows.

(1) The processing is started at step 1900. At step 1901, a table is created in order to carry out processing of two bits at one time.

(2) The variables S[0] and S[1] for storing calculation results are initialized at step 1902. The details of the above two steps were already explained.

(3) At step 1903, a random number R for scrambling equal to or less than x is generated to divide an exponent x. A pseudorandom number may be used as the above random number R.

(4) At step 1904, the exponent x is divided into two divided exponents t[0] and t[1] as follows.

t[0]=R and t[1]=x−R

Alternatively, as illustrated above, the exponent x can be divided by the equations t[0]=x AND R and t[1]=x AND ~R, where R is a random number.

(5) It is determined whether all bits of x have been checked at step 1905.

(6) If not all bits of x have been checked, it is further determined whether all bits of t[0] and/or t[1] have been checked. If only t[0] has been completely checked, t[1] continues to be checked. If only t[1] has been completely checked, on the other hand, t[0] continues to be checked. If neither t[0] nor t[1] has been completely checked, the process flow proceeds to steps in which a branch to follow is randomly determined. (step 1906)

(7) At step 1907, a random number v (0 or 1) is generated in order to determine which branch to follow. And it is determined whether the generated random number v is 0 or 1 at step 1908.

(8) If the random number v is 0, t[0] is checked at step 1909. If it is 1, on the other hand, t[1] is checked at step 1910.

(9) In either case, after all bits of both t[0] and t[1] are checked, modular multiplication of S[0] and S[1], that is, the operation S[0]*S[1] mod n is performed at step 1911.

(10) This calculation result gives the proper encrypted data at step 1912.

In the former method for randomly determining the order of the process steps, a bit block of t[0] and a bit block of t[1] are alternately checked regardless of the value of v. However, this method for randomly determining the order does not impose such a restriction. This is a significant difference between them.

It should be noted that the details of the modular multiplication routine for every two bits of the exponent shown in FIG. 17 are also applied to each modular multiplication routine employed in the process of FIG. 18.

This process makes it impossible to infer the order of the waveform of each consumed current. As a result, it becomes difficult to derive the bit pattern of x from the currents.

Figure 19:
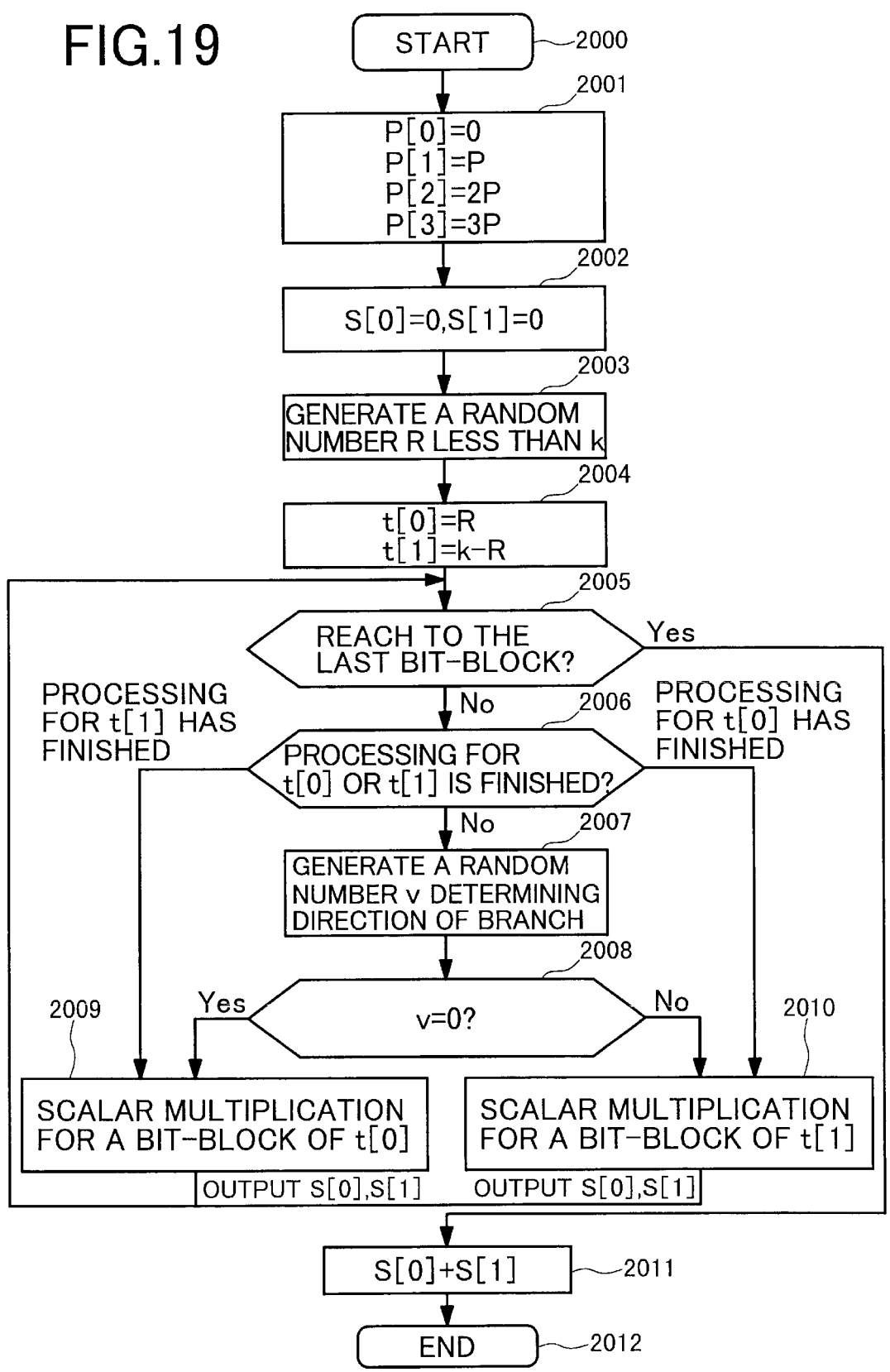
FIG. 19 is a flowchart showing a process of randomly determining the order of operations after a given scalar is divided.

Next, description will be made of a method for randomly determining the order of process steps using a scalar multiple k of a point P on an elliptic curve. This method is similar to the above method using modular multiplication. FIG. 19 shows the algorithm which is similar to that shown in FIG. 18. It goes without saying that the present method can be applied to a structure similar to that shown in FIG. 16.

The process flow shown in FIG. 19 proceeds as follows.

(1) At step 2001, a table is created in order to carry out processing of two bits at one time.

(2) The variables S[0] and S[1] are initialized at step 2002. The details of the above two steps were already explained.

(3) To divide a scalar k, a random number R equal to or less than k is generated at step 2003. A pseudorandom number may be used as the above random number R.

(4) At step 2004, the scalar k is divided into two divided scalars t[0] and t[1] as follows.

t[0]=R
t[1]=k−R

Alternatively, as illustrated above, the scalar k can be divided by the equations t[0]=k AND R and t[1]=k AND ~R, where R is a random number and ~R is the bit inverse of R.

(5) It is determined whether all bits of k have been checked at step 2005.

(6) If not all bits of k have been checked, it is determined whether all bits of t[0] and/or t[1] have been checked at step 2006.

(7) If only t[0] has been completely checked, t[1] continues to be checked. If only t[1] has been completely checked, on the other hand, t[0] continues to be checked. If neither t[0] nor t[1] has been completely checked, the process flow proceeds to steps in which a branch to follow is randomly determined. (step 2006)

(8) At step 2007, a random number v (0 or 1) is generated in order to determine which branch to follow.

(9) It is determined whether the generated random number v is 0 or 1 at step 2008.

(10) If the random number v is 0, t[0] is checked at step 2009. If it is 1, on the other hand, t[1] is checked at step 2010.

(11) In either case, after all bits of both t[0] and t[1] are checked, modular multiplication of S[0] and S[1] is performed at step 2011.

(12) This calculation result gives the proper encrypted data at step 2012.

Figure 20:
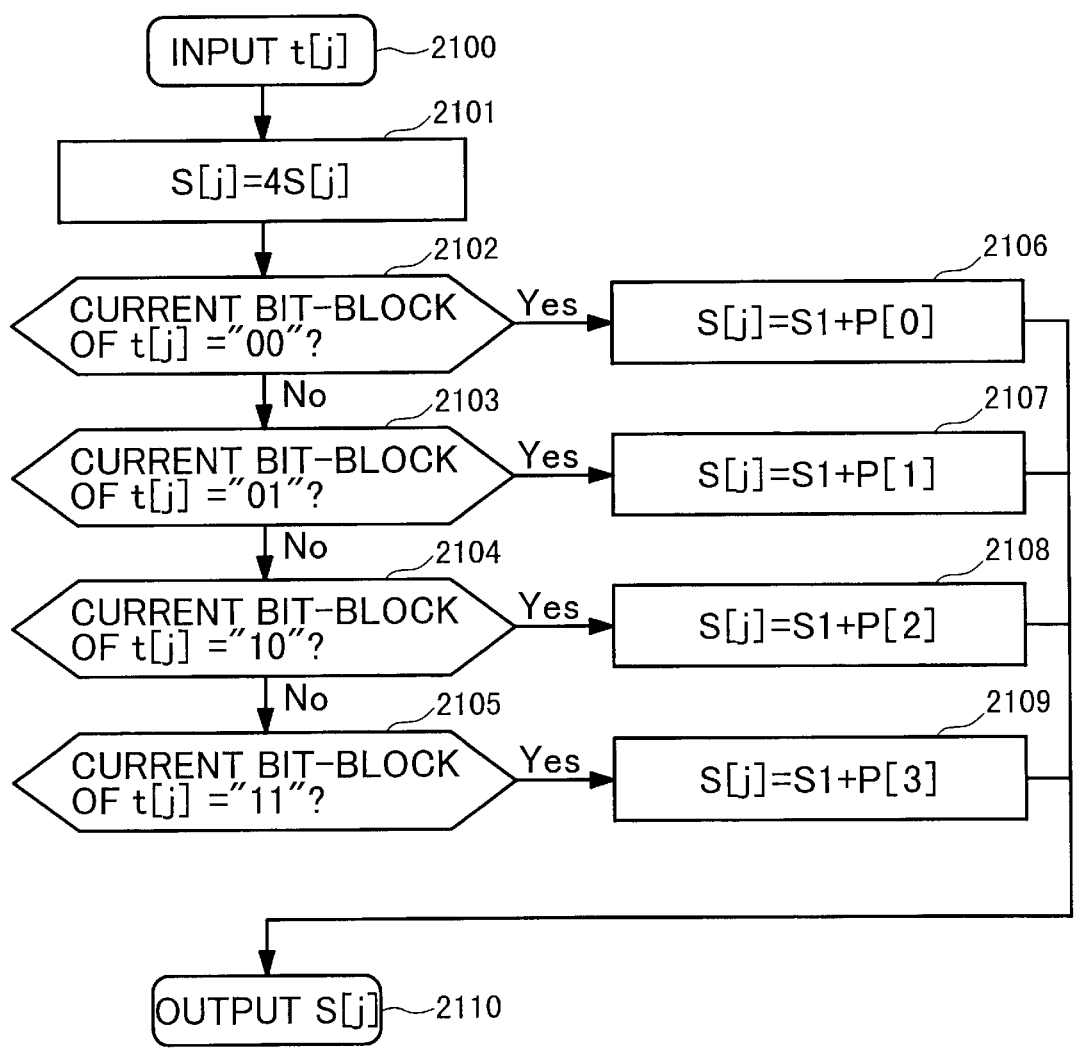
FIG. 20 is a flowchart showing a routine of performing a scalar multiple operation for every two bits of input data.

FIG. 20 shows the details of the scalar multiplication routine for every two bits of a scalar shown in FIG. 19.

Specifically, depending on whether the value of each bit block (two bits) of input t[j] is "00", "01", "10", or "11", addition of S1 and P[0], P[1], P[2], or P[3] on an elliptic curve is performed respectively. Then, the calculation result S[j] is output. This process makes it impossible to infer the order of the waveform of each consumed current. As a result, it becomes difficult to derive the bittern of k from the currents.

As illustrated above, the gist of the technical idea of an embodiment according to the present invention is to divide the bits of an exponent or a scalar to be processed into bit blocks so that the order of the processing of each bit block can be changed. As a result, the bit pattern looks to the current observer as if it were randomly changed.

There is a technique for changing a processing order other than the methods described above. For example, in the above embodiments, the exponent and the scalar are each split into two portions only. It should be noted, however, that they can each be split into three or four portions as well and, in order to generate a random number, a technique such as a quasi-periodic sequence or a chaotic sequence can be adopted. While the random numbers described so far can be regarded as random numbers of a periodical number series with a large period, random numbers pertaining to a series with a small period can also be used.

As is obvious from the above description, at an abstract level, the concept provided by the present invention for the modular exponentiation is exactly the same as the concept for the addition on an elliptical curve. It is natural to abstract the concepts into a level of abstraction beyond actual implementations.

In the embodiment for carrying out the modular exponentiation and the addition of points on an elliptical curve with modulo of n described above, if the processing to compute a product and the processing to compute a sum are denoted by a generic symbol ○, the flowcharts representing these pieces of processing become entirely identical with each other. They include the modular exponentiation as well as computation of a scalar multiple of a point on an elliptical curve and are effective for processing having a similar algebraic structure.

As described above in detail, in accordance with the preferred embodiments of the present invention, in an IC card chip, data is processed by splitting the data into portions processed in separate processes. Finally, results produced by the processes are integrated to give a correct end result. In addition, by varying an encryption key in a way not affecting the result, it becomes difficult to infer the processing and the encryption key from the waveform of a consumed current.

Embodiments of the present invention can provide a tamper-resistant information device for use with the IC card, etc. having high security.

The technical features of embodiments according to the present invention are described below.

1. A card comprising: means for inputting a signal; a storage unit for storing a program; an operation unit for performing predetermined data processing according to a program; and means for outputting a signal; wherein the program stored in the above storage unit includes one or more data processing instructions giving an execution direction to the operation unit; whereby when the signal input from the above data inputting means is subjected to data processing, at least one of the above data processing instructions instructs calculation of the expression A○B to be performed, where (and hereinafter) the characters "A" and "B" each denote a signal and the symbol "○" denotes a given operation, the above calculation including the steps of: arbitrarily dividing the above signal A into pieces A[1], A[2], . . . , and A[m], where A=A[1]+A[2]+ . . . +A[m] and m is an integer equal to or more than 1; arbitrarily dividing the above signal B into pieces B[1], B[2], . . . , and B[n], where B=B[1]+B[2]+ . . . +B[n] and n is an integer equal to or more than 1; by using the above pieces A[1], A[2], . . . , and A[m], and the above pieces B[1], B[2], . . . , and B[n], performing the operation ΣA[i]○B[j], where i=1, . . . , and m, and j=1, . . . , and n.

What is claimed is:

1. An information processing device comprising:

means for inputting a signal;

a storage unit for storing a program;

an operation unit for performing predetermined data processing according to a program; and means for outputting a signal;

wherein the program stored in said storage unit includes one or more data processing instructions giving an execution direction to the operation unit;

whereby when the signal input from said data inputting means is subjected to data processing, at least one of said data processing instructions instructs calculation of the expression A○B to be performed, where (and hereinafter) the characters "A" and "B" each denote a signal and the symbol "○" denotes a given operation, said calculation including at least one of the steps of:

(1) arbitrarily dividing said signal A into pieces A[1], A[2], . . . , and A[n], where A=A[1]+A[2]+ . . . +A[n] and n is an integer; by using said pieces A[1], A[2], . . . , and A[n], and said signal B, calculating each of the equations B[1]=A[1]○B, B[2]=A[2]○B, . . . , and B[n]=A[n]○B to obtain B[1], B[2], . . . , and B[n], separately; and performing the addition operation B[1]+B[2]+ . . . +B[n], where n is an integer equal to or more than 1;

(2) arbitrarily dividing said signal B into pieces B[1], B[2], . . . , and B[n], where B=B[1]+B[2]+ . . . +B[n] and n is an integer equal to or more than 1; by using said signal A and said pieces B[1], B[2], . . . , and B[n], calculating each of the equations A[1]=A○B[1], A[2]=A○B[2], . . . , and A[n]=A○B[n] to obtain A[1], A[2], . . . , and A[n], separately; and performing the addition operation A[1]+A[2]+ . . . +A[n], where n is an integer equal to or more than 1; and (3) arbitrarily dividing said signal A into pieces A[1], A[2], . . . , and A[m], where A=A[1]+A[2]+ . . . +A[m] and m is an integer equal to or more than 1; arbitrarily dividing said signal B into pieces B[1], B[2], . . . , and B[n], where B=B[1]+B[2]+ . . . +B[n] and n is an integer; by using said pieces A[1], A[2], . . . , and A[m], and said pieces B[1], B[2], . . . , and B[n], performing the operation ΣA[i]○B[j], where i=1, . . . , and m, and j=1, . . . , and n.

2. An information processing device comprising:

means for inputting a signal;

a storage unit for storing a program;

storage means for storing a result of a predetermined calculation;

an operation unit for performing predetermined data processing according to a program; and means for outputting a signal;

wherein the program stored in said storage unit includes one or more data processing instructions giving an execution direction to the operation unit;

whereby when the signal input from said data inputting means is subjected to data processing, at least one of said data processing instructions instructs calculation of the expression A^k to be performed, where (and hereinafter) the characters "A" and "k" each denote a signal, and A^k=A○A○ . . . ○A (the right side of the equation including k number of A's and "k−1" number of "○"s, which each denote an operation), said calculation including the steps of:

arbitrarily dividing said signal k into pieces k[1], k[2], k[3], . . . , and k[n], where k=k[1]+k[2]+k[3]+ . . . +k[n], and n is an integer;

by using said signal A and said pieces k[1], k[2], k[3], . . . , and k[n], calculating each of the equations h[1]=A^k[1], h[2]=A^k[2], . . . , and h[n]=A^k[n] to obtain h[1], h[2], . . . , and h[n], separately; and calculating the expression A^k by the equation A^k=h[1]○h[2]○ . . . ○h[n], where n is an integer equal to or more than 1.

3. An information processing device comprising:

means for inputting a signal;

a storage unit for storing a program;

a storage means for storing a result of a predetermined calculation;

an operation unit for performing predetermined data processing according to a program; and means for outputting a signal;

wherein the program stored in said storage unit includes one or more data processing instructions giving an execution direction to the operation unit;

whereby when the signal input from said data inputting means is subjected to data processing in which the expression A^x is to be calculated, where the characters "A" and "x" each denote a signal and A^x=A○A○ . . . ○A (the right side of the equation including x number of A's and "x−1" number of "○"s, which each denote an operation), at least one of said data processing instructions instructs calculation of the expression A^(x+T) to be performed instead, where A^T=e (the character e indicating an identity element).

4. An information processing method which lets plaintext on an information transmitting side and key information on an information receiving side be elements A and k, respectively, in a semigroup S' adopted by said information processing method, wherein said method performs calculation of the expression A^k, where A^k=AΔAΔ . . . ΔA (the right side of the equation including k number of A's and "k−1" number of "Δ"s, which each denote an operation in the semigroup S'), said calculation comprising the steps of:

arbitrarily dividing k into pieces k[1], k[2], k[3], . . . , and k[n], where k=k[1]+k[2]+k[3]+ . . . k[n], and n is an integer;

by using said plaintext A and said pieces k[1], k[2], k[3], . . . , and k[n], calculating each of the equations h[1]=A^k[1], h[2]=A^k[2], ..., and h[n]=A^k[n] to obtain h[1], h[2], ..., and h[n], separately; and calculating the expression A^k by the equation A^k=h[1]Δh[2]Δ ... Δh[n], where the symbol "Δ" denotes an operation in the semigroup S' and n is an integer equal to or more than 1.

5. The information processing method as claimed in claim 4, wherein said S, S', or S" is a communicative ring (also a semigroup) of residue classes modulo N, where N is a positive integer; the addition operation "+" is addition modulo N, that is, A+B=(A+B) mod N; and said multiplication operation ○, the operation Δ, or the operation ◇ is a multiplication residue operation modulo N, that is, A○B=A*B mod N, AΔB=A*B mod N, or A◇B=A*B mod N.

6. The information processing method as claimed in claim 4, wherein said S, S', or S" is a Mordell-Weil group G (E/Fq) for an elliptic curve E in a finite field Fq, where q=p^n and p is a characteristic (a prime number), and said operation Δ or the operation ◇ is addition in the Mordell-Weil group G (E/Fq).

7. A information processing method which lets plaintext on an information transmitting side and key information on an information receiving side be elements A and x, respectively, in a monoid S" (a semigroup having an identity element e) adopted by said information processing method, wherein when the expression A^x is to be calculated, where A^x=A◇A◇ ... ◇A (the right side of the equation including x number of A's and "x-1" number of "◇"s, which each denote an operation in the monoid S"), said method performs calculation of the expression A^(x+T) instead, where A^T=e.

8. The information processing method as claimed in claim 7, wherein said S, S', or S" is a communicative ring (also a semigroup) of residue classes modulo N, where N is a positive integer; the addition operation "+" is addition modulo N, that is, A+B=(A+B) mod N; and said multiplication operation ○, the operation Δ, or the operation ◇ is a multiplication residue operation modulo N, that is, A○B=A*B mod N, AΔB=A*B mod N, or A◇B=A*B mod N.

9. The information processing method as claimed in claim 7, wherein said S, S', or S" is a Mordell-Weil group G (E/Fq) for an elliptic curve E in a finite field Fq, where q=p^n and p is a characteristic (a prime number), and said operation Δ or the operation ◇ is addition in the Mordell-Weil group G (E/Fq).

* * * * *